(12) United States Patent
Randall

(10) Patent No.: US 11,597,512 B2
(45) Date of Patent: *Mar. 7, 2023

(54) AIRCRAFT HAVING VTOL, TRANSLATIONAL AND TRAVERSE FLIGHT

(71) Applicant: AMERICAN AVIATION TECHNOLOGIES, LLC, Boca Raton, FL (US)

(72) Inventor: Russell Randall, Land O Lakes, FL (US)

(73) Assignee: AMERICAN AVIATION TECHNOLOGIES, LLC, Boynton Beach, FL (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/080,472

(22) Filed: Oct. 26, 2020

(65) Prior Publication Data

US 2021/0253238 A1  Aug. 19, 2021

Related U.S. Application Data

(63) Continuation of application No. 16/659,265, filed on Oct. 21, 2019, now Pat. No. 10,814,974, which is a continuation of application No. 16/185,119, filed on Nov. 9, 2018, now Pat. No. 10,450,063, which is a continuation-in-part of application No. 12/157,180, filed on Jun. 5, 2008, now abandoned.

(60) Provisional application No. 60/941,965, filed on Jun. 5, 2007.

(51) Int. Cl.
  *B64C 29/02* (2006.01)
  *B64C 39/06* (2006.01)
  *B64C 39/00* (2023.01)

(52) U.S. Cl.
  CPC ............ *B64C 29/02* (2013.01); *B64C 39/008* (2013.01); *B64C 39/062* (2013.01)

(58) Field of Classification Search
  CPC ............ B64C 29/0033; B64C 29/0075; B64C 39/001; B64C 39/003; B64C 39/005; B64C 39/06; B64C 39/062; B64C 39/064; B64C 29/02; B64C 39/006; B64C 39/008
  See application file for complete search history.

(56) References Cited

U.S. PATENT DOCUMENTS

| 3,632,065 A * | 1/1972 | Rosta ...................... B64C 27/20 244/23 C |
| 3,633,849 A * | 1/1972 | Kling ...................... B64C 27/20 244/23 C |
| 6,402,088 B1 * | 6/2002 | Syrovy ................... B64C 27/28 244/23 C |
| 10,450,063 B1 * | 10/2019 | Randall ................... B64C 29/02 |
| 10,814,974 B2 * | 10/2020 | Randall ................... B64C 29/02 |

* cited by examiner

*Primary Examiner* — Richard R. Green
(74) *Attorney, Agent, or Firm* — Daniel S. Polley, P.A.

(57) ABSTRACT

An aircraft capable of Vertical Take-Off and Landing (VTOL) and traverse flight. The aircraft generally includes a fixed outer structure including at least a generally cylindrical wing having an internal body situated within the fixed outer structure. A space is defined between the internal body and the fixed outer structure. Within this space are one or more rotatable ring impellers that create(s) thrust sufficient to achieve lift for the aircraft.

20 Claims, 36 Drawing Sheets

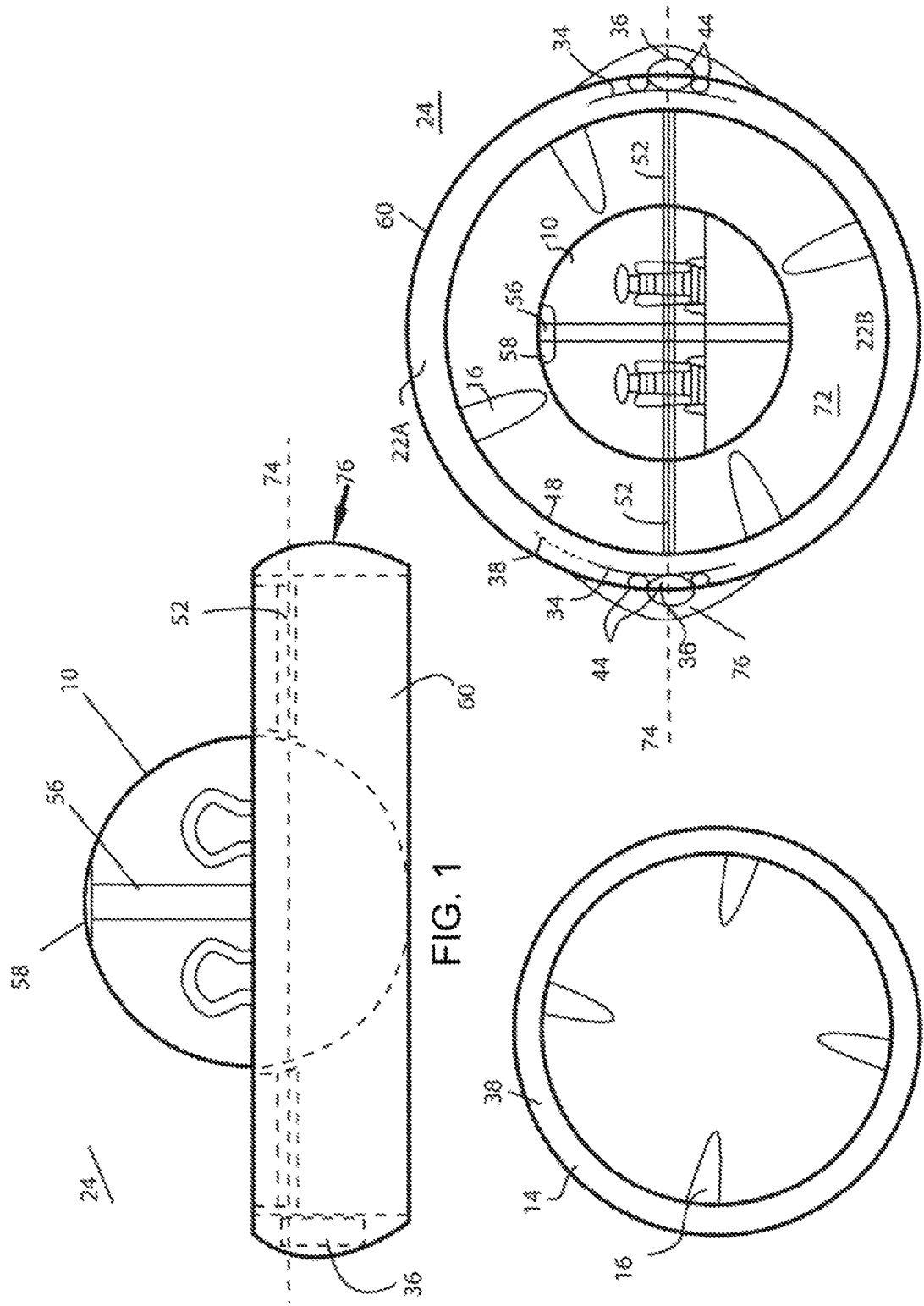

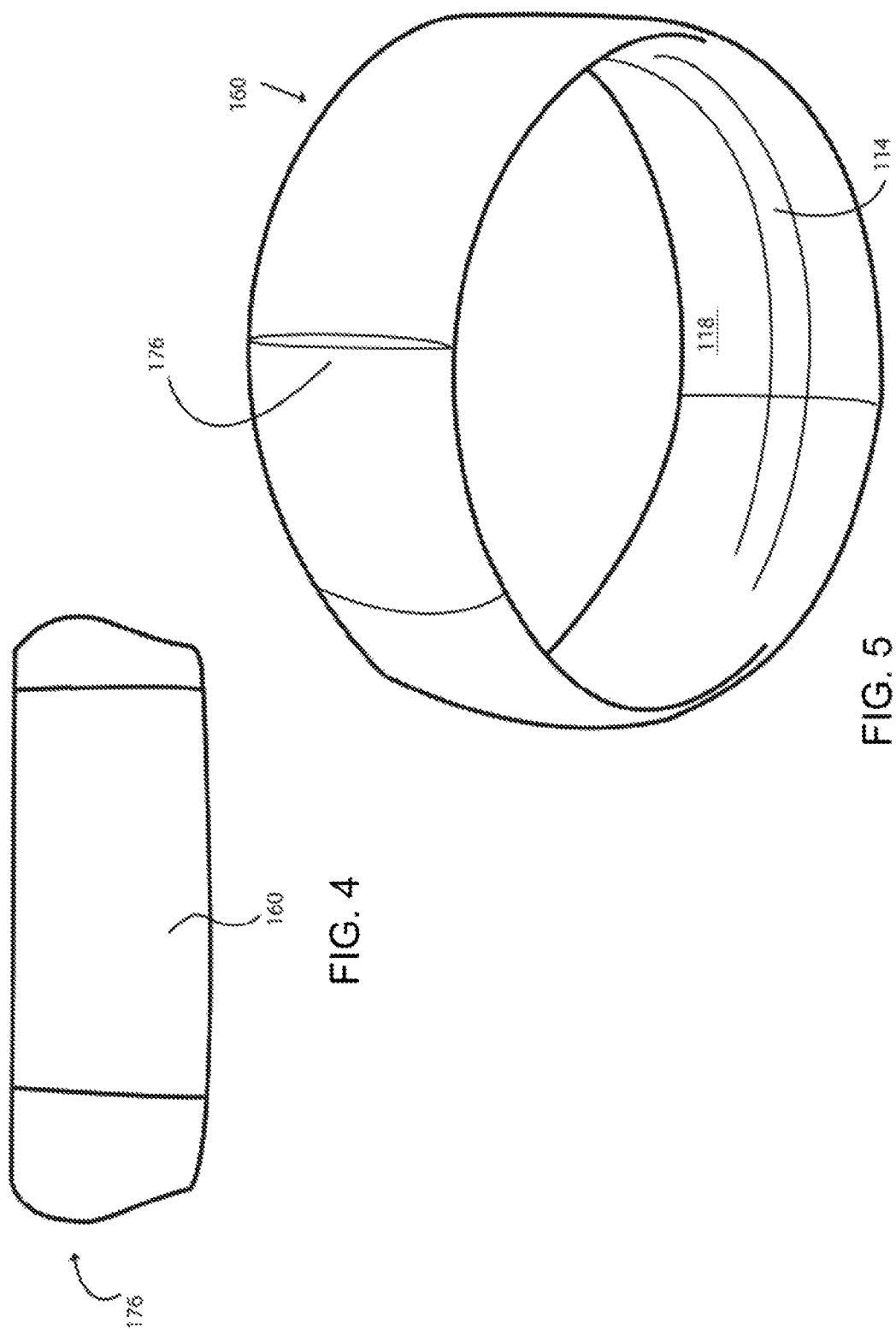

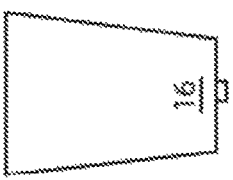
FIG. 8A
FIG. 8B
FIG. 8C
FIG. 8D
FIG. 8E
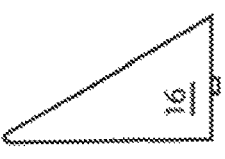
FIG. 8F
FIG. 8G
FIG. 8H
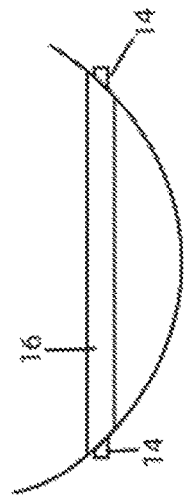
FIG. 8I
FIG. 8J
FIG. 8K
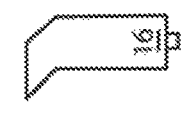
FIG. 8Q
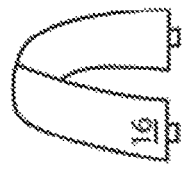
FIG. 8P
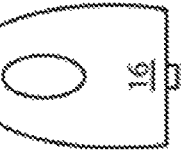
FIG. 8O
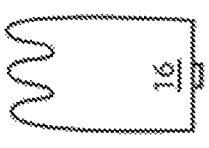
FIG. 8N
FIG. 8M
FIG. 8L

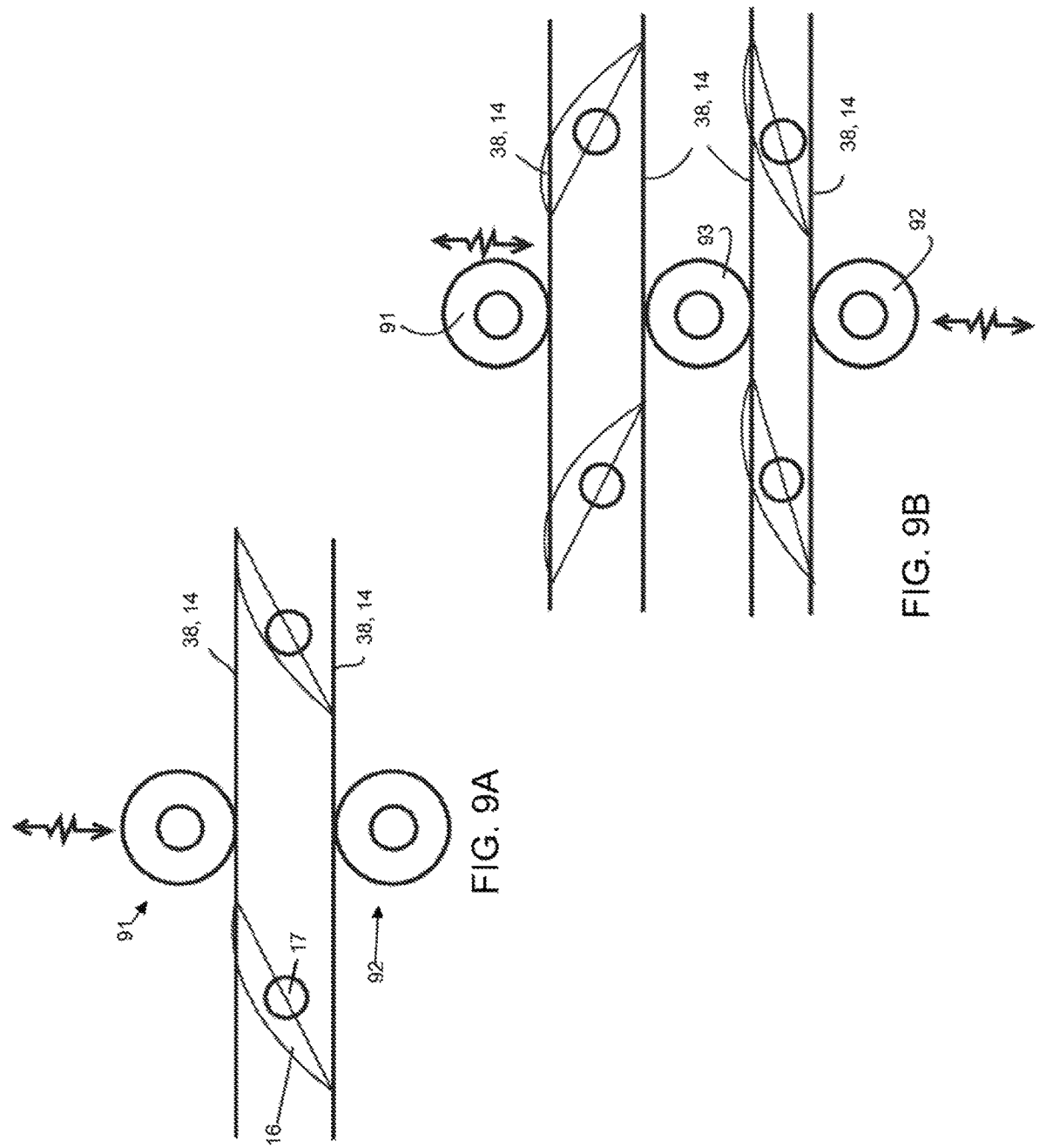

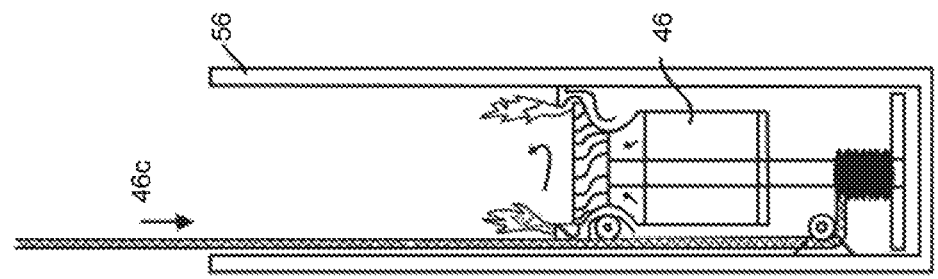
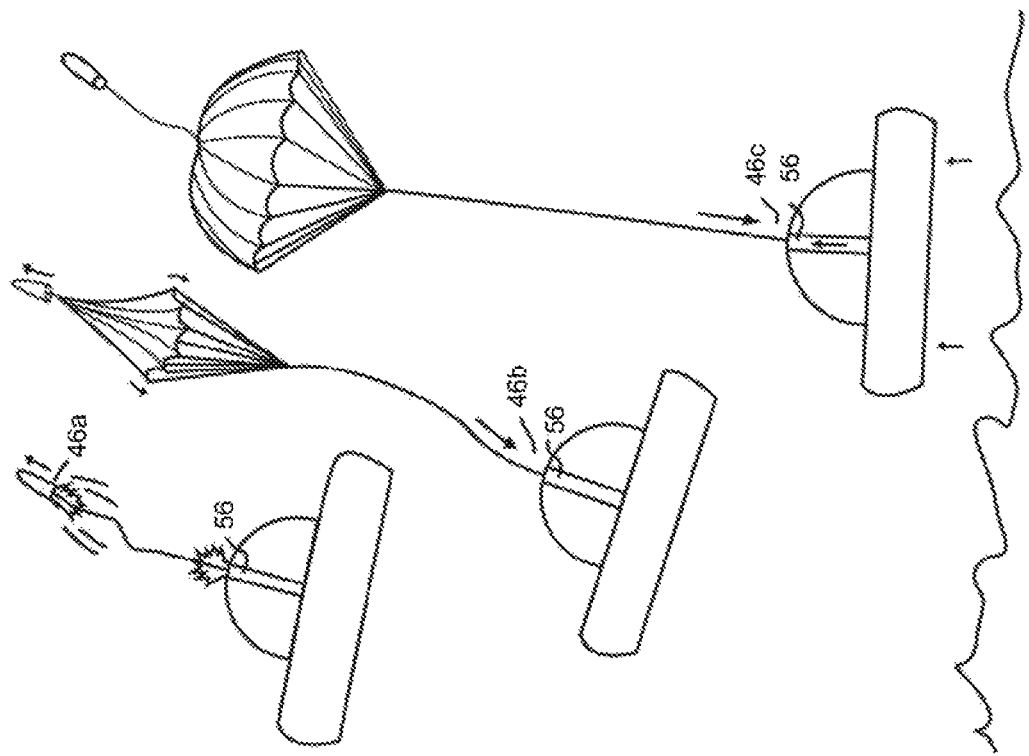
FIG. 21B
FIG. 21A

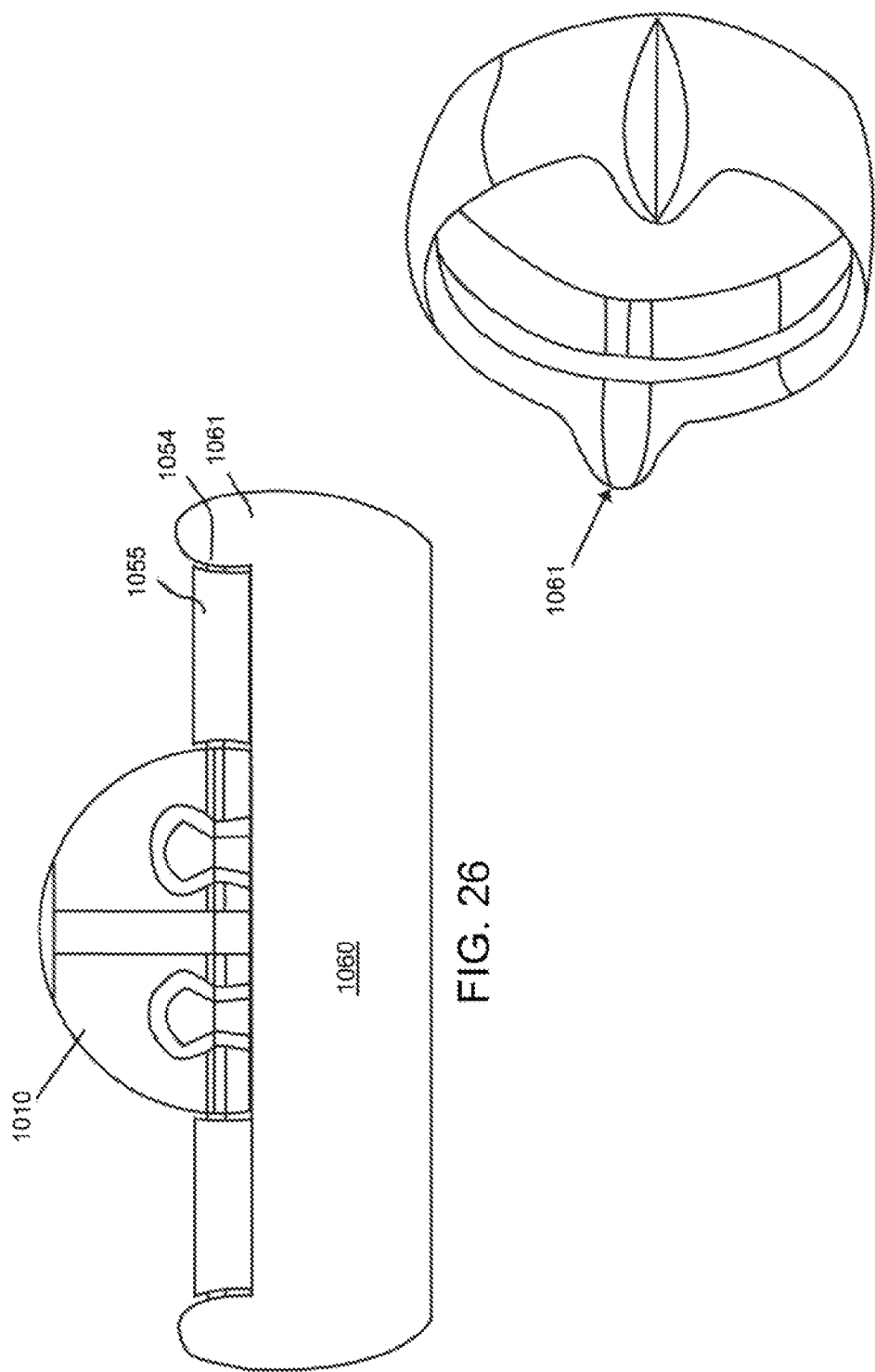

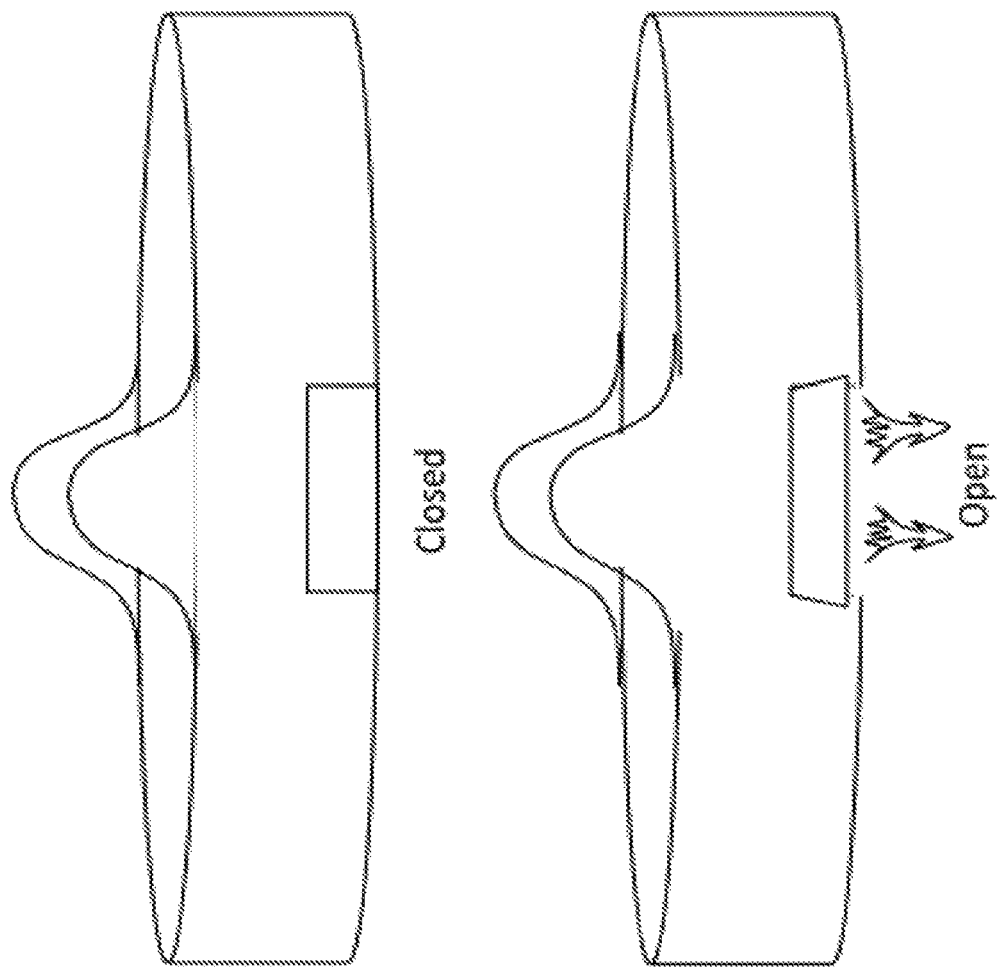

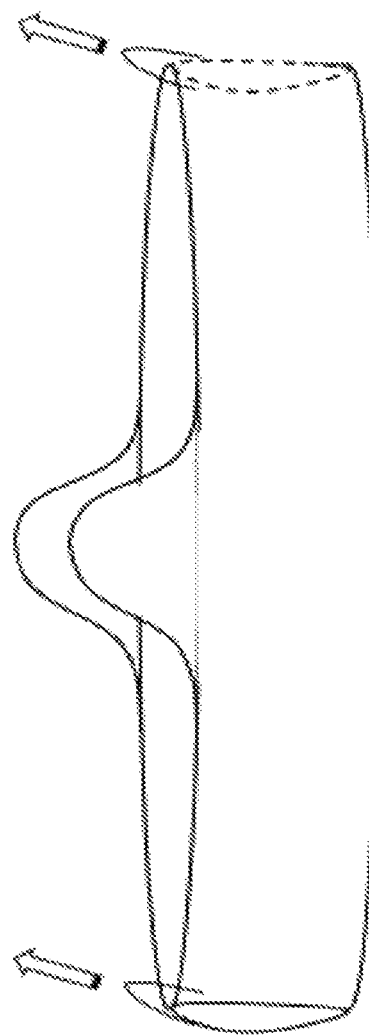
FIG. 30 Open
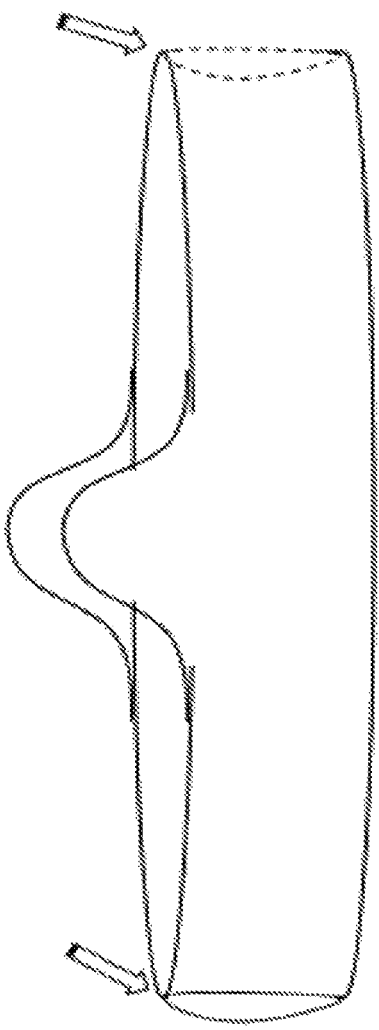
FIG. 31 Closed

One or more impellers within the ring-shaped wing

Cockpit payload enclosure different shapes examples

Cockpit payload enclosure different shapes examples. These shapes may also be cross sections or combinations of plan views or cross sections Examples of possible shapes of continuous wing.

Wing and cockpit payload enclosure different shapes examples. These shapes may also be cross sections or combinations of plan views or cross sections.

Wing and cockpit payload enclosure different shapes examples. These shapes may also be cross sections or combinations of plan views or cross sections.

Internal vent gates or valves shown dotted lines

Internal Vent gates or valves shown dotted lines

One or multiple propellers may be attached to the wing structure.

Top View

Propellers may be attached to wing structure in various ways.

AIRCRAFT HAVING VTOL, TRANSLATIONAL AND TRAVERSE FLIGHT

This application is a continuation of U.S. application Ser. No. 16/659,265, filed Oct. 21, 2019, which is a continuation of U.S. application Ser. No. 16/185,119, filed Nov. 9, 2018, now U.S. Pat. No. 10,450,063, which is a continuation-in-part of U.S. application Ser. No. 12/157,180, filed Jun. 5, 2008, which claims the benefit of and priority to U.S. Application Ser. No. 60/941,965, filed Jun. 5, 2007. All prior applications are fully incorporated by reference in their entireties for all purposes.

FIELD OF THE DISCLOSURE

The disclosure relates generally to aircrafts and more particularly to powered-lift Vertical Take Off and Landing (VTOL) aircraft.

BACKGROUND

Since powered flight began, the need to eliminate runways has compounded substantially. Airports are the overall bottlenecks in aeronautical transportation and they are taking an ever increasing amount of time to drive to and from, parking, wait in ever increasing lines, baggage portage and claims, etc.

Vertical takeoff and landing capability is also a most sought after capability in military missions having a variety of special benefits. Historically this has been handled almost entirely by the helicopter and while the helicopter has been an indispensable asset their drawbacks are many leaving yet again a need for a solution.

While there have been various forms of aircraft that do not need runways to operate, they usually have such major drawbacks that they are very limited in their applications.

Helicopters have the obvious open rotor threat and corresponding noise; require an expert to fly with both hands and feet; undesirable vibrations; require a tail rotor to counter the imparted torque to the hanging fuselage; and are complex, expensive to fly and maintain. Further, helicopters require the weight and expense of specialized landing gear. Additionally, helicopters usually only have one power source without back-up or parachute options.

Gyrocopters and gyroplanes, while not needing a tail rotor still have an open rotor and still yield most of the helicopter's drawbacks.

Tilt rotor is currently exceedingly expensive, also noisy, complex to control, operate and maintain. Very few tilt-rotor aircraft even exist at present time.

Thrust vectoring, the ability of an aircraft or other vehicle to direct the thrust from its main engine(s) or jets, can only be reasonably considered for military applications as they are deafening, profoundly expensive, and have huge heat signatures among others.

Another category is that of "powered lift". According to the Federal Aviation Authority (FAA) categorization, "Powered-lift means a heavier-than-air aircraft capable of vertical takeoff, vertical landing, and low speed flight that depends principally on engine-driven lift devices or engine thrust for lift during these flight regimes and on nonrotating airfoil(s) for lift during horizontal flight." 14 C.F.R. 1.1. However, since the FAA recognized this new category, few, if any, feasible aircrafts for this category have been developed, either for the military or civilian application.

Therefore, it is desirable to provide an aircraft capable of VTOL as well as effective forward flight (not necessarily "low speed" flight as categorized in the FAA definition of powered-lift) that overcomes the above-described limitations and deficiencies with other aircraft.

SUMMARY OF THE DISCLOSURE

Generally, disclosed is a powered-lift Vertical Take Off and Landing (VTOL) aircraft capable of vertical takeoff, hover, aerodynamic flight (including, but not limited to level, horizontal flight), return to hover and vertical landing. Disclosed herein is an aircraft capable of Vertical Take-Off and Landing (VTOL) and traverse flight. This novel aircraft generally includes a fixed outer structure including at least a wing having an internal body situated within the fixed outer structure. A space can be defined between the internal body and the fixed outer structure. Within this space can be one or more rotatable ring impellers that create(s) thrust sufficient to achieve lift, or "powered-lift". As used herein, the term "powered-lift" is not intended to have the restraints imposed by the FAA. Rather, the term "powered-lift" as used herein refers to lift for vertical take-off, hovering, landing and/or maneuvering achieved by one or more rotatable ring impellers within a space formed by one or more wing structures.

According to the disclosure, a powered-lift aircraft is provided that can include one or more propulsion impeller rings that are carried by a generally cylindrical wing (60) and rotatably supported within a generally cylindrical cavity defined by the wing (60). The one or more propulsion impeller rings (14) are disposed between an inner surface of the wing (60) and a cockpit payload enclosure (10) that's surrounded by and pivotally mounted to the wing, and the aircraft includes an attitude control system configured to maintain a longitudinal axis of the cockpit payload enclosure (10) in a generally constant level attitude relative to the earth's surface independent of the attitude of the wing (60). Also according to the invention a generally cylindrical wing (60) is provided that has a non-constant cross sectional shape contoured to provide lift in at least one of an upper and a lower semi-cylindrical portion of the wing.

Also, a propulsion impeller ring drive system (14) can be provided that is supported within a generally cylindrical wing (60) or alternately, within the cockpit payload enclosure (10). The generally cylindrical wing (60) can house a mechanically driven propulsion impeller ring that derives power from at least one prime mover, and a mechanical drive operatively connected to the propulsion impeller ring and including one or more components selected from the list of components comprising a belt-drive, a friction roller drive, a magnetic drive, an electric motor, a gear drive, and an air bearing drive. The propulsion impeller ring drive system (14) can be provided and can be supported within a generally cylindrical wing (60) or alternately, within the cockpit payload enclosure (10).

The generally cylindrical wing (60) can house a mechanically driven propulsion impeller ring that derives power from at least one prime mover, and a mechanical drive operatively connected to the propulsion impeller ring and including one or more components selected from the list of components comprising a belt-drive, a friction roller drive, a magnetic drive, an electric motor, a gear drive, and an air bearing drive.

Also disclosed is a method for controlling the attitude of an airborne vehicle by asymmetrically controlling the pitch of impeller blades.

The propulsion impeller ring drive system (14) can be provided that includes a propulsion impeller ring comprising a plurality of impeller blades (16) pivotally supported on a ring for variable pitch control and including an asymmetric impeller blade pitch control system operatively connected to the impeller blades and actionable to cause the propulsion impeller ring to provide asymmetrical thrust by individually and differentially controlling the pitches of the impeller blades.

In one non-limiting embodiment, the asymmetric impeller blade pitch control system can comprise a pair of contra-rotating pitch control rings that sandwich impeller blades (16) of a propulsion impeller ring and are asymmetrically manipulable in such a way as to cause the propulsion impeller ring to provide asymmetrical thrust through individual differential control of the pitches of the impeller blades. Alternatively, the asymmetric impeller blade pitch control system can include billow-mounted air bearings (30) that are disposed between the pitch control rings and the impeller blades (16).

The propulsion impeller rings can be contra-rotatably supported within the generally cylindrical cavity defined by the generally cylindrical wing (60), A contra-rotatable propulsion impeller ring drive system can be provided that comprises contra-rotatable propulsion impeller ring supported by air bearings (30).

The asymmetric impeller blade pitch control system can comprise a pair of contra-rotating pitch control rings that sandwich the impeller blades (16) of a propulsion impeller ring and can be asymmetrically manipulable in such a way as to cause the propulsion impeller ring to provide asymmetrical thrust through individual differential control of the pitches of the impeller blades. Alternatively, the asymmetric impeller blade pitch control system can include billow-mounted air bearings (30) that are disposed between the pitch control rings and the impeller blades (16).

An emergency ballistic recovery system can also be provided that can include an automatic riser retractor configured to partially retract risers and/or a cable suspending at least a portion of a powered-lift aircraft (24) from a parachute or parasail canopy immediately following chute deployment. In addition, a second retraction stage may be added to further soften the landing, activated by a ground proximity sensor.

BRIEF DESCRIPTION OF THE DRAWINGS

The foregoing summary as well as the following detailed description of preferred embodiments of the invention will be better understood when read in conjunction with the appended drawings. For the purposes of illustrating certain disclosed embodiments, there is shown in the drawings embodiments which are presently preferred. It should be understood, however, that the invention is not limited to the precise arrangements and instrumentalities shown. In the drawings, where:

FIG. 1 is a schematic front view of a non-limiting aircraft embodiment constructed according to the disclosure and showing a wing of the aircraft oriented axially vertically for vertical flight, hovering or landing;

FIG. 2 is a schematic front view of the aircraft of FIG. 1 showing the wing of the aircraft oriented axially horizontally for generally level flight;

FIG. 3 is a schematic axial view an impeller ring having representative impeller blades extending radially inwardly from a propulsion impeller ring;

FIG. 4 is a radially-inward view of a non0limiting wing embodiment for an aircraft described herein;

FIG. 5 is a perspective view of the wing shown in FIG. 4;

FIGS. 8A-8Q shows various embodiments of impeller blades

FIG. 9A shows a roller having an integral driveshaft extending from a powerplant;

FIG. 9B shows a first impeller ring having blades thereon that are provided between a first set of plates, and a second impeller ring having blades thereon that are provided between a second set of plates;

FIG. 21A is a parachute deployment and retraction system;

FIG. 21B is a parachute retraction mechanism;

FIGS. 26 and 27 show a side view and a perspective view, respectively, of another wing configuration;

FIGS. 28 through 34 illustrate leading or trailing movable surfaces, such as flaps, that can be provided on the wing structure in accordance with the present disclosure;

DETAILED DESCRIPTION

Figure 7:
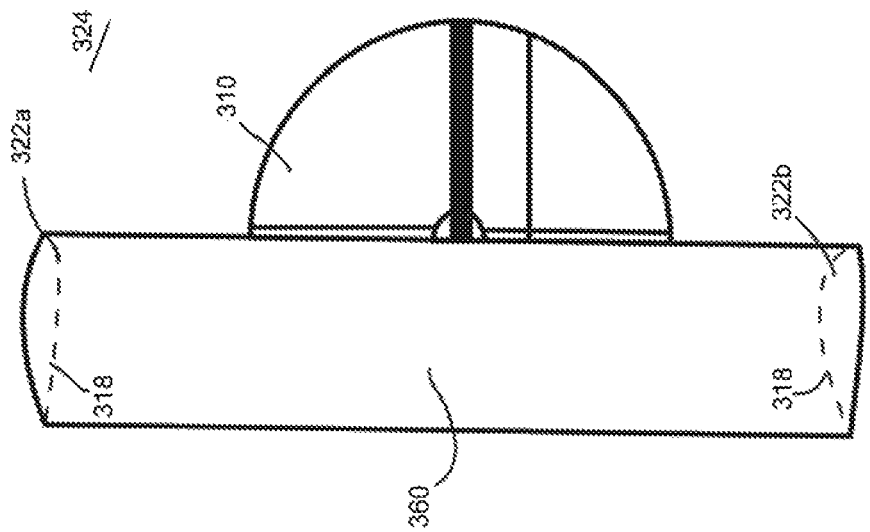
FIG. 7 depicts a side view of a powered lift aircraft in accordance with one non-limiting embodiment of the disclosure.

FIG. 1 shows a schematic front view of an aircraft (24) capable of Vertical Take Off and Landing (VTOL), translational flight and generally level flight, and showing in one non-limiting embodiment a wing (60) of the powered-lift aircraft (24) oriented axially vertically for vertical flight, hovering or landing. FIG. 2 is a schematic front view of the powered-lift aircraft (24) of FIG. 1 showing the wing (60) of the powered-lift aircraft (24) oriented at some angle for translational flight, or axially horizontally for traverse or generally level flight. According to the disclosure, a powered-lift aircraft is provided that includes one or more propulsion impeller rings that are carried by a generally cylindrical wing or toroid-shaped wing (60) and rotatably supported within a generally cylindrical cavity (72) defined by the wing (60).

Referring to FIGS. 1 and 2, the aircraft (24) can include one or more propulsion impeller rings (14) that are carried by the wing (60). The one or more propulsion impeller rings (14) are disposed between an inner surface of the wing (60) and a cockpit payload enclosure (10) that can be surrounded by and pivotally mounted to the wing. The aircraft may include an attitude control system configured to maintain a longitudinal axis of the cockpit payload enclosure (10) in a generally constant level attitude relative to the earth's surface, independent of the attitude of the wing (60). FIG. 3 showing four representative impeller blades (16) extending radially inwardly from a propulsion impeller ring (14). The ring (14) may be carried within, for instance, the wing (60) of the powered-lift aircraft (24) of FIGS. 1 and 2.

The powered-lift VTOL aircraft (24), includes a cockpit payload enclosure (10) surrounded by and pivotally-mounted within a generally cylindrical wing (60) or duct. An axle structure (52) provides connection between a cockpit payload enclosure (10) is attached by to opposing sides of the wing (60). Thus, a load sharing axis (74) is created by the axle structure (52) that connects the wing (60) with the cockpit payload enclosure (10). The cockpit payload enclosure (10) may be fixed to the axle structure (52) and rotatably carried on or within the wing (60), for instance, on a suitable bearing. Alternatively, the axle structure (52) may be fixed at opposing sides of the wing (60) and pass through the cockpit payload enclosure (10) or a portion thereof (where the cockpit payload enclosure (10) is rotatable upon the axle structure (52). In additional alternative embodiments, the axle may be selectively coupled and decoupled from the wing (60) and/or the cockpit payload enclosure (10).

One rotatable or plural coaxially rotatable (contra-rotatable or co-rotatable), rim-driven propulsion impeller rings (14) with impeller blades (14) may be rotatably supported by the wing (60) between an inner surface of the wing (60) and the cockpit payload enclosure (10). Each propulsion impeller ring (14) may include one or a plurality of radially-disposed impeller blades (16). (As used in the present application the inventor intends the term "impeller" as the device that causes the propulsion of axial-flow air through the wing, rather than centrifugal-flow fluid propulsion).

In general, lift is provided when the impeller rings (14) rotate at rotational speeds sufficient to provide thrust force overcoming the weight of the aircraft (24). Furthermore, translational or generally level flight may be attained as described herein, whereby the thrust forces required may be minimized by suitable aerodynamic wing (60) configuration as described herein.

Thus, a method of powered-lift flight is provided that includes creating vectored thrust sufficient to achieve powered-lift. The thrust is generated by at least one impeller blade (16) attached to at least one propulsion impeller ring (14), the ring (14) being installed on or in a wing (60). The ring (14) including impeller blades (16) is generally rotatably carried or supported inside of the space (72) created by the wing (60). The cockpit payload enclosure (10) is also provided which is mounted generally within the axial rotation of the propulsion impeller ring (14). (Note that the wing (60) carrying the impeller ring (14) having blades (16) is capable of flight without the cockpit payload enclosure (10)).

In one embodiment, after a vertical take off, translational or generally level flight may be attained by rotation of the wing (60) relative the cockpit payload enclosure (10) in about the axle (52), with continued rotation of the impeller rings (14). In this embodiment, the cockpit payload enclosure (10) is attached by the axle structure (52) to opposing sides of the wing (60) with associated mechanisms to controllably pivot the wing (60) about the cockpit payload enclosure (10).

In another embodiment, after a vertical take off, translational or generally level flight may be attained by rotation of the impeller blades (16) pitch or angle of attack to relative airflow to change the angle of propulsion. In this embodiment, the cockpit payload enclosure (10) is attached by the axle structure (52) to opposing sides of the wing (60) in a manner to form gimbals. The center of gravity within the cockpit payload enclosure (10) may be varied, for instance, in flight, to cause the wing (60) to tilt forward (with respect to the plane of the so called 'great circle' (the circle on the surface of a sphere corresponding with a circumference of a sphere that divides a sphere into two hemispheres) of the spherical cockpit payload enclosure (10) as oriented in the upright position as shown in FIGS. 1 and 2) to translate from lift off or hovering to generally level flight, or from generally level flight to descent flight or backward to translate, for instance, from level flight or hovering to reverse flight.

The cockpit payload enclosure (10) may be pivotally mounted to maintain a generally constant level attitude relative to the earth's surface. This attitude may be maintained, or any other desired attitude, whether the wing (60) and propulsion impeller ring (14) are oriented axially vertically for vertical, or near vertical flight or hovering (FIG. 1), whether the wing (20) and propulsion impeller ring (16) are oriented axially horizontally for translational or generally level flight (FIG. 2), or whether the wing (60) is between the axially vertical and horizontal attitudes.

Certain components of the powered-lift aircraft (24), as shown in the drawings, may be almost completely symmetrical, which allows for more cost-effective production methods to be used than would otherwise be possible. The symmetrical or nearly symmetrical shapes include the sphere, the ovoid, and the torroid, which can provide for structurally strong geometrical shapes.

The powered-lift aircraft (24) may be maneuvered by changing the attitude of the wing (60) and propulsion impeller ring (14), therefore, changing both the thrust vector of the powered-lift aircraft (24) and the angles of attack of the impeller blade(s) (16) and the upper and lower lifting surfaces of the wing (60).

The impeller (14) may be caused to rotate by a variety of sources. For instance, referring to the example of FIGS. 1 and 2, powerplants (36) generally within bulging powerplant nacelles (76) on opposing side of the wing (60). In general, one or more powerplants (e.g., engines or electric motors) may be carried in or upon the wing (60), or in or upon the cockpit payload enclosure (10), and operably coupled with the impeller ring (14) to cause rotational force. An engine may include prime movers such as combustion engines, turbine engines, air motors, turbine engines, jets, turbofans, electric motors, flywheels, rockets. Associated fuel sources may be provided in or upon the wing (60), in or upon the cockpit payload enclosure (10), or both. In further embodiments, one or more electric motors may be provided, wherein an associated electric power source may include batteries, supercapacitors (e.g., for propulsion surges), and/or fuel cells, which may be provided in or upon the wing (60), in or upon the cockpit payload enclosure (10), or both. Electrical collection, e.g., for recharging batteries or capacitors, may be accomplished by conventional recharging (e.g., docking to AC or DC power supply), one or more photovoltaic cells upon the aircraft (24), and/or wind turbines (e.g., suitably positioned to minimize air resistance).

Referring now to FIG. 4, a radially-inward view of a wing (160) is provided. Additionally, FIG. 5 shows a perspective view of the wing of FIG. 4. This wing (160), including impellers operably carried as described herein, may be used as an aircraft (e.g., with payload and/or cockpit space formed in or on the wing, not shown), may serve as the wing (60) shown with respect to aircraft (24) described above, or may be uses as a component in another aircraft configuration. The wing (160) includes powerplant nacelles (176) and has a streamline aerodynamic shape in the direction of flight. In addition, FIG. 5 schematically depicts an impeller ring (114) on an inside surface (118), which is rotatably supported as described herein.

The wing structures described herein are described as having a generally cylindrical shape. However, it should be understood that a "generally cylindrical wing" refers to any three dimension structure which may have non-parallel walls having a duct of constant or varying cross section in a circular, oval and/or ovoid shape (e.g., the dimensions and/or the shape may change along the length of the axis) through a central axis, and may encompass toroid-shaped structures. In addition, in certain embodiments, the cross section of the thickness of the wing structure differs at different locations on the wing, and these configurations are also intended to be encompassed by the phrase "generally cylindrical wing".

Figure 6:
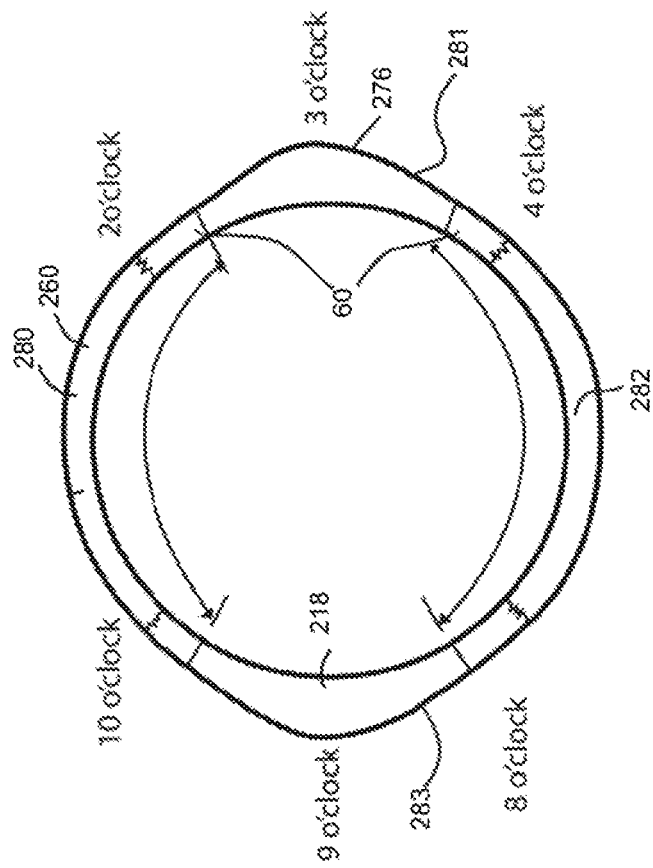
FIG. 6 is a view of a wing showing four quadrant regions.

In certain non-limiting examples, and referring to FIG. 6, a wing (260) includes four quadrant regions (280) corresponding with the 10 o'clock to the 2 o'clock section of the wing (260); (281) corresponding with the 2 o'clock to the 4 o'clock section of the wing (260); (282) corresponding with the 4 o'clock to the 8 o'clock section of the wing (260); and (283) corresponding with the 8 o'clock to the 10 o'clock section. In certain configurations, sections (280) and (282) include suitable carrying structure (e.g., bearings, tracks) for an impeller ring, and have an exterior shape and dimension to act as an airfoil, for instance, in translational flight and generally level flight; and sections (281) and (283) include a powerplant (in one section only or in both section) and structures for mechanically cooperating a powerplant driveshaft to the impeller ring, and has an exterior bulging shape to accommodate powerplant nacelles (276).

Thus, as shown in FIG. 6, a wing (360), from a horizontal axis in the circular view, includes four quadrants including an upper aerodynamic lifting quadrant (280) at the top of the wing, two side housing quadrants (281), (283) on either side of the wing, and a lower aerodynamic lifting quadrant (282) at the bottom of the wing. The side housing quadrants (281), (283) of a wing (360) houses one or more components selected from the group of components consisting of one or more powerplant components (e.g., at least one engine or motor), a power transfer unit, fuel or energy storage, cockpit and/or payload, flight-related components, or any combination including at least one of the foregoing components. In further embodiments, the side housing quadrants (281), (283) of a wing (360) may house one or more components including but not limited to jet turbines, rotary engines, motors, batteries, fuel cells, capacitors, compressed gas, photovoltaic cells, prime movers, belt drives, gear drives, electric drives, hydro drives, gas drives, traction/friction drives; nuclear fuel, liquid fuel, compressed gas fuel, solid fuel, electronics, avionics, landing gear, and a storage space.

FIG. 7 depicts a side view of a powered lift aircraft 324 similar to that shown with respect to FIG. 1 shown in forward flight (to the righ as oriented in the page) and with hidden lines showing airfoil-shaped cross sections of upper (322a) and lower (322b) quadrants of the wing (e.g., corresponding to quadrants (280), (282) shown with respect to FIG. 6. The wing (360) is this asymmetrical in the sense that it may have a non-constant cros-sectional shape contoured to provide an asymmetric airfoil cross-section of wing (360) in upper (322a) and lower (322b) semi-cylindrical sectors or quadrants of the wing. The asymmetrical airfoil cross-section wings (360) will provide more lift than would a symmetric cross-section, particularly as the angle of attack of the airfoils approaches zero, assuming that the relative wind passing across the wing (360) structure is sufficient to generate lift, i.e., generally, when the aircraft (324) is in or near level flight relative to the earth's surface. In this configuration, the upper and lower quadrants or semi-cylindrical portions provide a bi-wing or bi-plane configuration in a flying duct. By adding features to the axle connecting the cockpit (310) to the wing (360) (e.g., described as axle (52) with respect to FIGS. 1 and 2) such as a shroud having an airfoil shape, as a middle wing, a tri-plane configuration can be attained. Further, by forming the cockpit in a shape approximating an airfoil, or encasing the cockpit in such a shaped structure, as a middle wing, a tri-plane configuration can also be attained.

During forward flight, when the wing (360) is axially horizontally oriented and its axis is generally parallel to the relative wind, the upper (322a) and lower (322b) quadrants of the wing (60) act as lifting bodies. These upper and lower quadrants or semi-cylindrical portions may have airfoil cross sections that are either cambered or otherwise asymmetrically shaped. In other embodiments, the airfoil cross-sections may be symmetrical.

FIGS. 8A-8Q show various embodiments of impeller blades (16) in different configurations. In certain examples, such as shown in FIG. 8H, the impeller blade(s) (16) has a constant cross-sectional shape along its length. In certain examples, such as shown in FIGS. 8B and 8D, the impeller blade(s) (16) has a consistent but tapered cross sectional shape along its entire length. In certain examples, such as shown in FIGS. 8A, 8C, 8F, and 8G, the impeller blade(s) (16), the impeller blade(s) (16) has an asymmetrical shape along its length. In certain examples, such as shown in FIGS. 8F, 8G, 8J, 8K, 8L, 8M, and 8N, the impeller blade(s) (16) has a curved shape along its length. In certain examples, such as shown in FIGS. 8A, 8B, 8C, 8D and 8E, the impeller blade(s) (16) has a tapered shape along its length. In certain examples, such as shown in FIG. 8P, the impeller blade(s) (16) has a twisted shape along its length. In certain examples, such as shown in FIGS. 8A, 8B, 8C, 8D, 8E, 8P and 8Q, the impeller blade(s) (16) has a tapered and twisted shape along its length. In certain examples, such as shown in FIGS. 8I and 8K, the impeller blade(s) (16) has no tip. In certain examples, such as shown in FIGS. 8I and 8P, the impeller blade(s) (16) is connected in two places to the impeller ring (14) (where in FIG. 8I the impeller blade connects across diameter of the ring, and in FIG. 8P the two places of connection are across the height of the impeller ring.

Also according to the invention, a propulsion impeller ring drive system is provided that is supported within a generally cylindrical wing or alternately, within the cockpit payload enclosure. Also according to certain embodiments, a generally cylindrical wing is provided that houses a mechanically driven propulsion impeller ring that derives power from at least one prime mover, and a mechanical drive operatively connected to the propulsion impeller ring and including one or more components selected from the list of components consisting of a belt-drive, a friction roller drive, a magnetic drive, an electric motor, a gear drive, and an air bearing drive.

Referring back to FIGS. 1 and 2, a propulsion impeller ring drive system may include one or more drive belt (s) (34) providing, for instance, friction power from the prime mover (s) (36) (e.g., via one or more spur gears (44) as shown in FIG. 2) to the outer propulsion impeller ring surface(s). Alternatively, the propulsion impeller ring drive system may transfer power by friction from the prime mover(s) (36) through four parallel, generally co-planar pinch rollers, an inner pair of the pinch rollers being driven in counter-rotation by the prime mover(s) and an outer pair of the pinch rollers being idling pinch rollers positioned to maintain a requisite amount of friction between the driven rollers.

In certain non-limiting embodiments, and referring now to FIG. 9A, a roller (91) is provided, for instance, having an integral driveshaft extending from a powerplant. Roller (91) an opposing roller (92) (which may be passive or also coupled to a driveshaft or powerplant) are in frictional engagement with surfaces (38) of an impeller ring (14). The rollers drive the ring (14) by frictional engagement with the surfaces (38) of the ring (34). In addition, the embodiment of FIG. 9A depicts an example of impeller blades (16) having adjustable pitch. For instance, top and bottom portions of the impeller blades are attached to top and bottom plates. The top and bottom plates may be compressed or expanded by pushing or pulling, respectively, the roller (91).

In a similar manner, and referring now to FIG. 9B, a first impeller ring (14) having blades (16) thereon are provided between a first set of plates, and a second impeller ring (14) having blades (16) thereon are provided between a second set of plates. A roller (93) is positioned between the first set of plates and the second set of plates. Rollers (91) and (92) are also provided, roller (91) being positioned on the outside of the first set of plates, and roller (92) being positioned on the outside of the first set of plates. By driving one or more of the rollers, the first impeller ring is rotated in one direction, and the second impeller ring is rotated in the opposite direction, referred to as coaxial contra-rotation. Furthermore, the plates may be squashed independently, for instance, where the blades of the first impeller ring are at a different angle than the blades of the second impeller ring.

Figure 10:
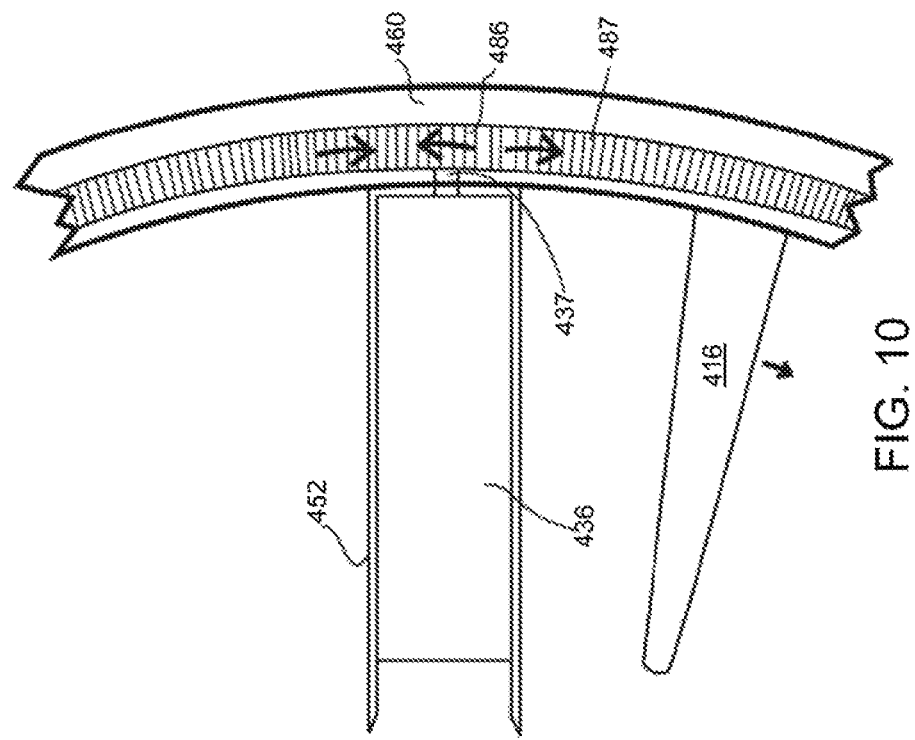
FIG. 10 shows a driveshaft extending from an axle.

In certain embodiments, and referring now to FIG. 10, a driveshaft (437) is provided extending from an axle (452) that carries the cockpit (not shown) and the wing (460). The powerplant (436), shown housed within the axle (452), may also be in the cockpit with the driveshaft (437) extending from the powerplant (436) through the axle (452). The driveshaft (437) is coupled to a pinion (486), which rotates in a first direction and is meshed with teeth of bevel or ring gear rack (487), causing bevel or ring gear (487) to rotate in a direction generally opposite the first direction. Rack (487) is integral with or coupled to the impeller ring having impeller blade(s) (416) extending therefrom.

Figure 11:
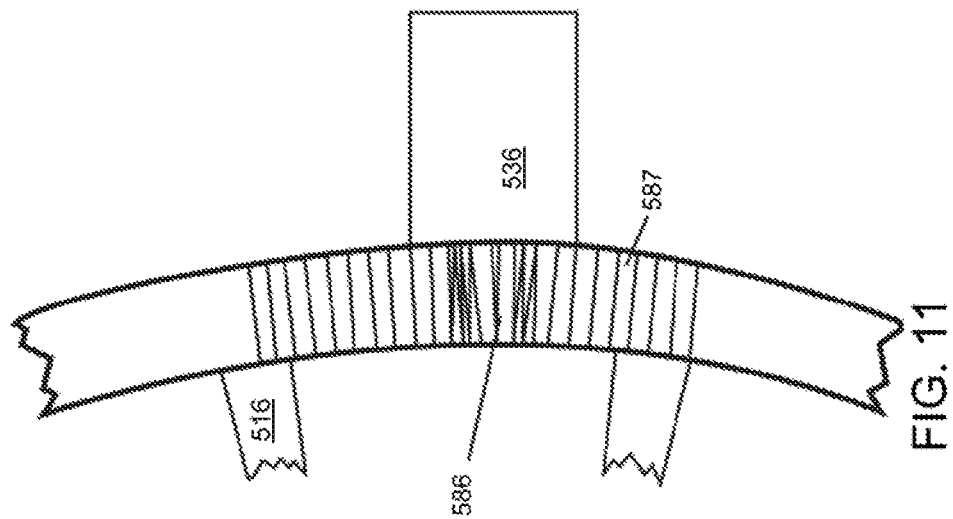
FIG. 11 shows a powerplant outside of the impeller ring.

In other non-limiting embodiments, and referring now to FIG. 11, a powerplant (536) is provided outside of the impeller ring, for example, within the body of the wing structure or extending outwardly therefrom. The powerplant (536) is coupled to a pinion 586, which rotates in a first direction and is meshed with teeth of bevel gear (587), causing bevel or ring gear (587) to rotate in a direction generally opposite the first direction. Bevel gear (587) is integral with or coupled to the impeller ring having impeller blade(s) 516 extending therefrom.

Figure 12:
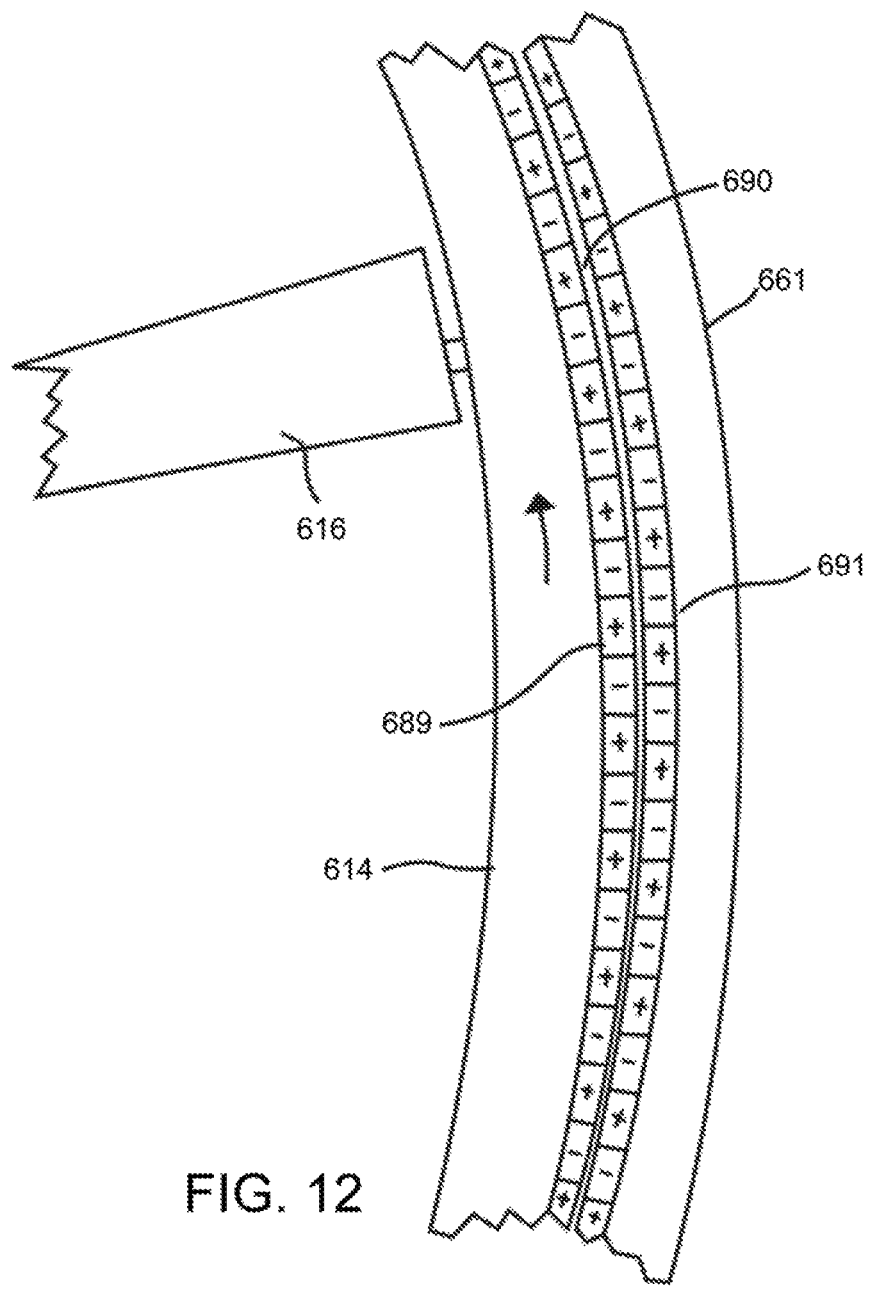
FIG. 12 shows an electromagnetic drive mechanism.

Referring now to FIG. 12, another embodiment of a drive mechanism for an impeller ring (614) is shown, generally in the configuration of an electromagnetic drive mechanism. This mechanism may be one or more phases, conventional rotor-stator type motor configuration, brushless motor configuration, or permanent magenta motor configuration. Impeller ring (614) (having blade(s) (616)) can include alternating polarity rotor magnets (689) or electromagnets (689) (depending on the motor configuration) fixed to the impeller ring (614) (as shown, on a surface of the impeller ring (614) facing outside of the ring). Correspondingly, the wing structure or a support structure (661) to the wing structure includes. In addition, the wing structure (660) includes alternating polarity rotor electro magnets (691) or magnets (691) (depending on the motor configuration, wherein the component (689) and (691) are opposite, i.e., when (689) is a magnet, (691) is an electromagnet, and vice versa). As is known in the field of electric motors, an air gap (690) is provided between the stator and rotor components (691), (689).

Also according to certain non-limiting embodiments disclosed herein, a method and system is provided for controlling the attitude of an airborne vehicle by asymmetrically controlling the pitch of impeller blades. Thus, a propulsion impeller ring drive system is provided that includes a propulsion impeller ring comprising a plurality of impeller blades pivotally supported on a ring for variable pitch control. In certain embodiments, the propulsion impeller ring drive system includes an asymmetric impeller blade pitch control system operatively connected to the impeller blades. The asymmetric impeller blade pitch control may be actuated to cause the propulsion impeller ring to provide asymmetrical thrust by individually and differentially controlling the pitches of the impeller blades. For instance, in a ring configuration with four blades, two of the blades may be actuated so that the degree of pitch is greater or less than the other two blades to provide asymmetrical thrust.

Also, in certain non-limiting embodiments described herein, according to the invention, an asymmetric impeller blade pitch control system is provided that comprises a pair of coaxial contra-rotating pitch control rings that sandwich impeller blades of a propulsion impeller ring and are asymmetrically actuatable in such a way as to cause the propulsion impeller ring to provide asymmetrical thrust through individual differential control of the pitches of the impeller blades. Alternatively, or in combination, the asymmetric impeller blade pitch control system includes billow-mounted air bearings that are disposed between the pitch control rings and the impeller blades, as described herein.

Figure 13:
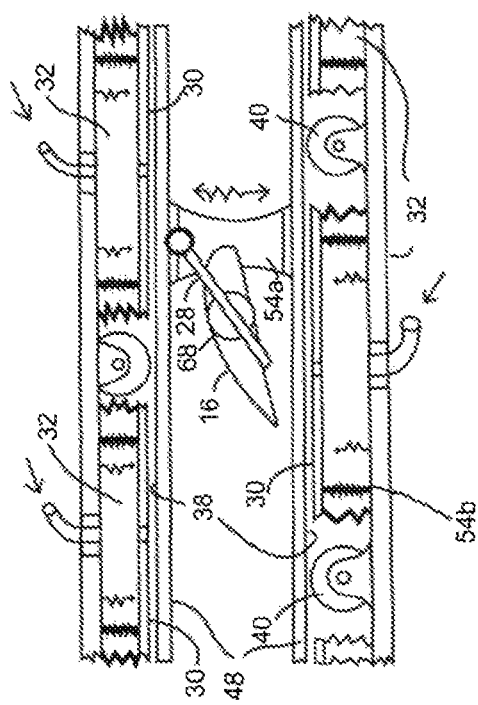
FIGS. 13 and 14 show a radial view cross section and tangential cross section, respectively, of the propulsion impeller ring.
Figure 14:
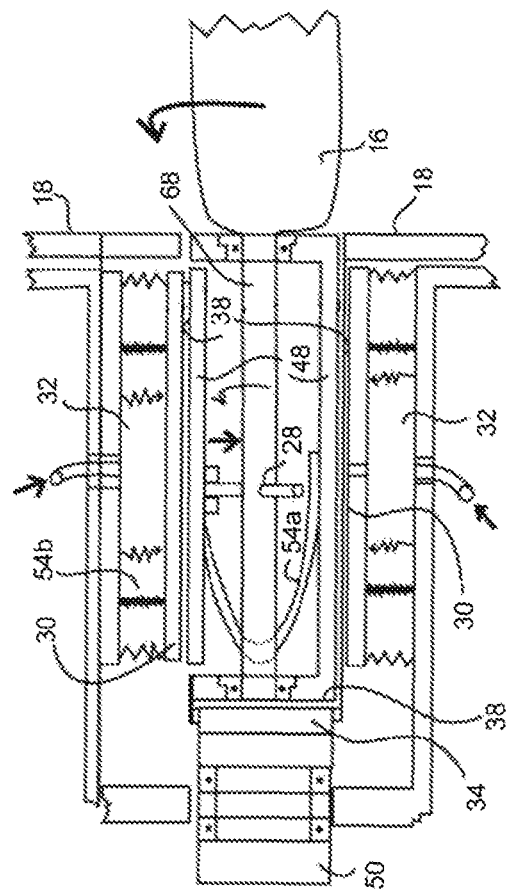

Referring to FIGS. 13 and 14, a radial view cross section and tangential cross section, respectively, of the propulsion impeller ring is shown. The propulsion impeller ring drive system is actionable to asymmetrically adjust the pitch of the impeller blades (16) in such a way as to change the attitude of the wing (60) and/or to control the flight path of the aircraft. To allow for asymmetrical impeller blade pitch control, propulsion impeller ring pitch control rings or squash plates (48) may be supported in such a way as to sandwich the impeller blades at a base (68) of each impeller blade (14) and be manipulated by hydraulic rams and/or mechanical linkages (28) in such a way as to control impeller blade pitch.

The propulsion impeller ring drive system may transfer power by friction from the powerplant through four parallel, generally co-planar pinch rollers, an inner pair (40) of the pinch rollers being driven in counter-rotation by the prime mover (s) and an outer pair (42) of the pinch rollers being idling pinch rollers positioned to maintain a requisite amount of friction between the driven rollers.

In other non-limiting embodiments, air bearings (30) mounted on air bellows (32) may be positioned above and/or below the drive ring squash plates (48) to change the pitch of the impeller blades (16), as well as to reduce friction between the rotating impeller blades (16) and the corresponding drive ring squash plates (48). This provides for very precise and responsive control of the powered-lift aircraft (24) at any speed or aspect of translation between hover and forward flight. A compression spring (54a) is provided to maintain compression on the impeller blade base (68), and extension springs (54b) are shown in the bellows (32) to maintain the bellow in an extended state. The air bellow force, for instance, introduced by forcing air into the bellows, overcomes the springs (54a), (54b) to adjust the pitch.

A propulsion impeller ring drive system may be housed within the wing and operatively connected to the impeller blades (16) of each contra-rotatable propulsion impeller ring (14) and arranged to individually and incrementally pivot the impeller blades to provide variable pitch control (16). The propulsion impeller ring drive system may be arranged to impart counter-rotational force to counter-rotate the impeller blades (16).

The powered-lift aircraft (24) may be maneuvered by changing the attitude of the wing (60) and propulsion impeller ring (14), therefore, changing both the thrust vector of the powered-lift aircraft (24) and the angles of attack of the impeller blade(s) (16) and the upper and lower lifting surfaces of the wing (60). This may be accomplished by actuating squash plates that asymmetrically change the respective pitches of the impeller blade(s) (16).

Figure 15:
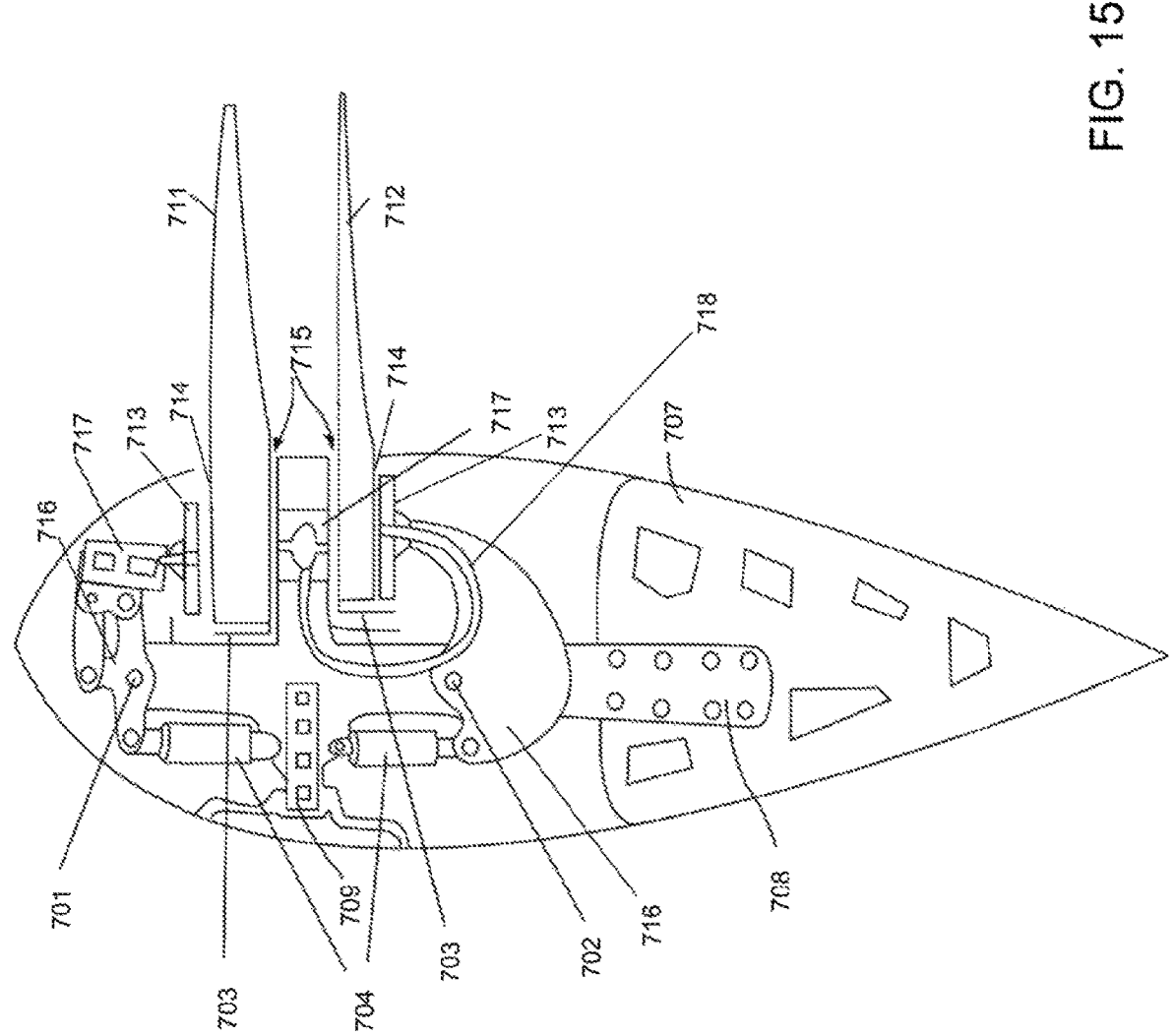
FIG. 15 is a cross sectional view of the wing of the powered-lift aircraft of FIGS. 1 and 2 showing contra-rotatable propulsion impeller rings of the powered-lift aircraft supported on a portion of a propulsion impeller ring drive system carried by and within the wing.

In another non-limiting embodiment, and referring to FIG. 15, a variable pitch coaxial contra-rotating impeller control system is shown, which features very low friction. Impeller blades (711), (712) having the ability to vary the pitch or angle of attack compressing against an air bearing (713) the outer surfaces (714) against a film of pressurized air, e.g., an air bearing film (715). Blades (711), (712) may rotate the same direction or opposite directions on the air bearing film (715). A drive surface (703) may comprise a belt drive surface, a gear drive surface, or other suitable drive surface. Hydraulic pitch actuators (704) can also be provided but may alternatively be electromechanical or pneumatic actuators. Actuators (704) impart a force on lever arms (716) that pivots on fulcrums (701) and (702) that imparts a leverage force on the opposite side of the fulcrums to air bearing (713). Each of fulcrums (701) and (702) can operate independently of each other and impart an increase or reduction in pitch to each of the impeller's blades (711), (712). A structural ring (709) is shown and is outward of the structural manifold (717). Structural manifold (717) contains air pressure (e.g., 60 psi) and supply the air bearings via pressurized conduits or hoses (718). Member (707) is a structural member that supports directly or indirectly structures within the wing body and may be a rib or outer wing skin support.

Figure 16:
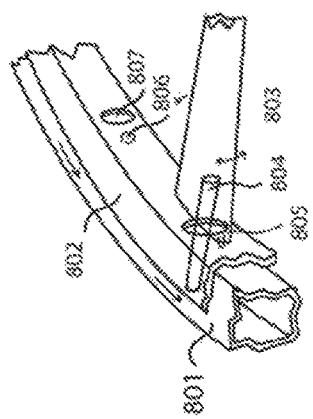
FIG. 16 shows a cross sectional view of another non-limiting embodiment of a pitch control mechanism in accordance with the present disclosure.

FIG. 16 shows a cross-sectional view of another non-limiting embodiment of a pitch control mechanism, showing an impeller drive ring (801), a squash-plate pitch control shield (802), impeller blade (803), an impeller support shaft (804), a pitch control shaft (805), a pitch control shaft hole (806) and an impeller shaft through slot (807). To change the pitch of impeller blade (803), a force is applied to a squash-plate pitch control shield (802) in a vertical axis in relation to impeller drive ring (801). This imparts a pivoting force on impeller blade (803) through the pitch control shaft (805) that is inserted into a hole (806). Impeller blade (803) is supported by impeller support shaft (804). Impeller support shaft (804) passes through the slot (807) and into the impeller drive ring (801).

Figure 17:
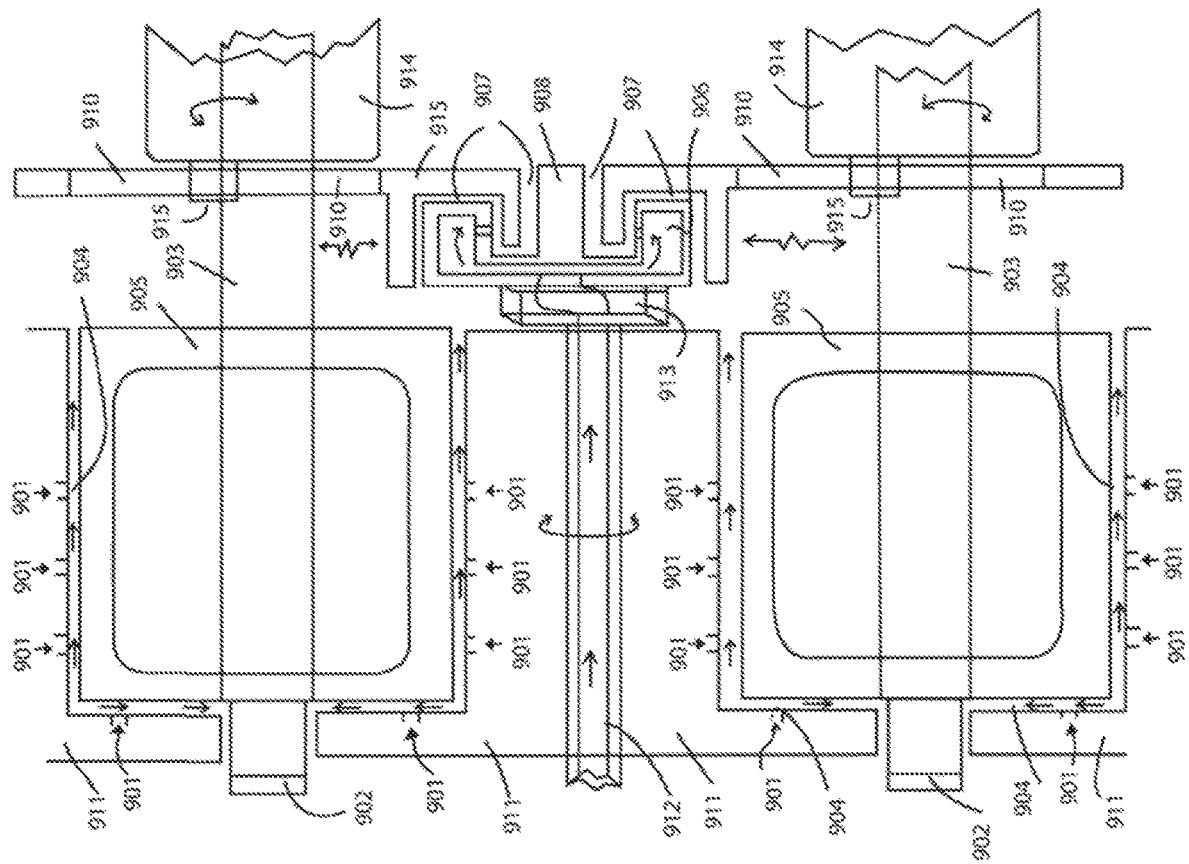
FIG. 17 shows a cross sectional view of a pitch control mechanism showing two impeller rings.

FIG. 17 shows a cross-sectional view of a pitch control mechanism showing two impeller rings. The impeller rings (905) are supported by air bearings (904) and air is supplied through holes (901) in the support structure (911). A hollow shaft (912) connects to a control arm (913), which supplies air pressure to an "E" shaped pitch control air bearing (908) with an internal air pressure manifold (906) that distributes air through holes into the air bearing (907). When a rotational force is applied to the shaft (912), the control arm (913) imparts a lifting force on (908) which through the air bearing imparts a force on both the upper and lower squash plate pitch control shields (915). Also shown in FIG. 17 are the impeller support shafts (903), impeller blades (914), impeller drive ring surfaces (902) that may be gear teeth, pulley teeth, electromagnetic or other suitable structures. Slots (910) allow the squash plate pitch control shields to slide around the impeller support shafts (903) parallel to the axis of the impeller drive rings axis of rotation and impart torque to the impeller blades through a shaft parallel to the impeller shaft extending outward from the base of the impeller blade into or through the squash plate control shields (915).

In certain non-limiting embodiments, the propulsion impeller rings can be coaxially contra-rotatably supported within the generally cylindrical cavity defined by the generally cylindrical wing. Also according to certain non-limiting embodiments, a contra-rotatable propulsion impeller ring drive system can be provided that comprises contra-rotatable propulsion impeller ring supported by air bearings, as described above. Furthermore, an asymmetric impeller blade pitch control system is provided that comprises a pair of contra-rotating pitch control rings that sandwich impeller blades of a propulsion impeller ring and are asymmetrically manipulable in such a way as to cause the propulsion impeller ring to provide asymmetrical thrust through individual differential control of the pitches of the impeller blades. Alternatively, the asymmetric impeller blade pitch control system includes billow-mounted air bearings that are disposed between the pitch control rings and the impeller blades. As non-limiting examples, FIGS. 15, 9B and 17 show various non-limiting embodiments of coaxial contra-rotating impellers with independent pitch control for each set of blades.

A propulsion impeller ring drive system may be housed within the wing and operatively connected to the impeller blades (16) of each contra-rotatable propulsion impeller ring (14) and arranged to individually and incrementally pivot the impeller blades to provide variable pitch control (16).

The propulsion impeller ring drive system (14) may be arranged to impart counter-rotational force to counter-rotate the impeller blades (14).

In certain non-limiting embodiments, it may be desirable to have co-rotating coaxial impellers. For instance, one ring is provided having a first set of blades optimized for fuel efficiency, and another ring is provided having a second set of blades optimized for lifting force. During lift off, the second set of blades may be used, with the first set pitched to avoid interaction, or to compliment the second set of blades. Once leveled, the first set of blades may provide sufficient thrust in conjunction with the airfoil configuration, thereby realizing fuel efficiency benefits.

The multiple impeller rings herein may be driven by a single powerplant or each may be individually driven.

Figure 19:
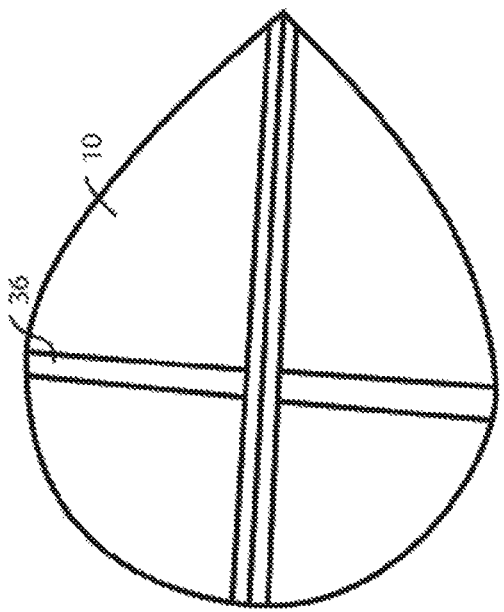
FIGS. 18, 19 and 20 show various configurations for a cockpit payload enclosure.
Figure 20:
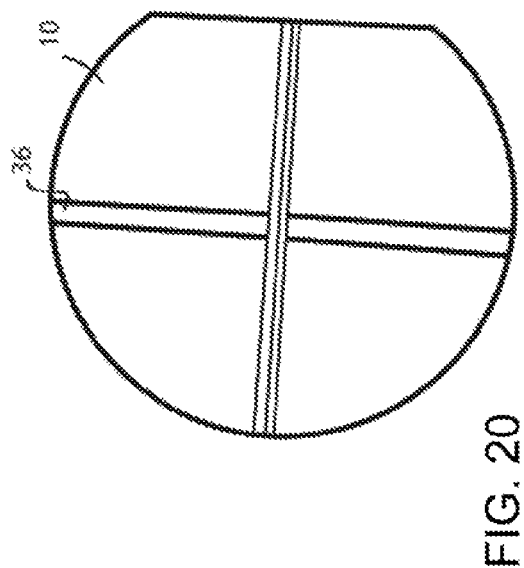
Figure 18:
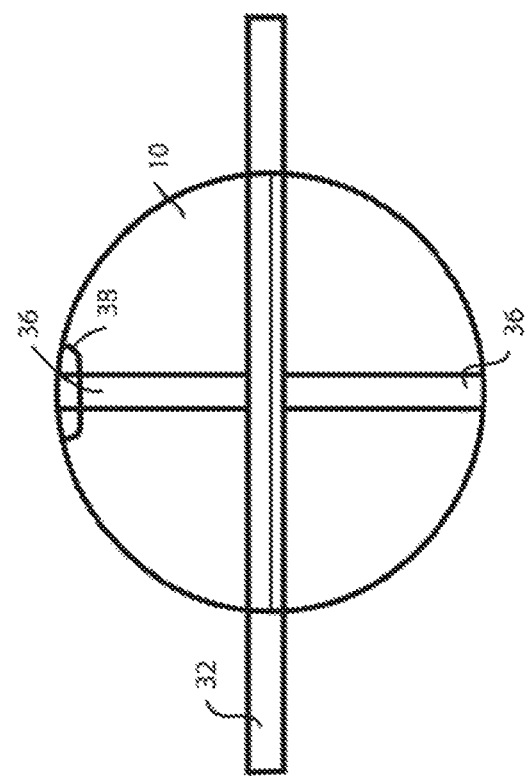

FIGS. 18, 19 and 20 show various configurations for a cockpit payload enclosure (10). The cockpit may contain conventional apparatus and systems as found in aircraft, including avionics, flight controls, weapons systems controls, "black box" apparatus. In addition, as discussed herein, the cockpit may also contain mechanisms and controls for the cockpit sphere, e.g., to alter center of gravity. In addition, as discussed herein, a parachute and retraction system may be included. Furthermore, a radar and thermal imaging (e.g., FLIR) region 58 may be provided, schematically depicted in FIG. 1.

Furthermore, the cockpit may be formed of a suitable shape. For instance, FIG. 18 shows a cockpit payload enclosure (10) in a generally spherical configuration having an airfoil control surface enveloping pivot axle (52). FIG. 19 is a schematic side view of a cockpit payload enclosure (10) in a tear-drop configuration, for instance, suitable to serve as a middle wing of a tri-plane configuration in generally level flight as described herein. FIG. 20 is a schematic side view of alternative cockpit payload enclosure (10) configuration, having a truncated trailing end. The cockpit payload enclosure (10) may include a spherical or hemispherical outer wall that is partially transparent and partially opaque. Alternatively, portions of the outer wall may be convertible from opaque to transparent through any one of a number of different means to include polarization or coatings. The outer wall of the cockpit payload enclosure (10) may be battle-hardened or armored. The outer wall may be completely or almost completely transparent to allow for unprecedented viewing above, to the sides, behind, and below during hover, transition, and/or aerodynamic flight.

As shown in certain non-limiting embodiments, the powered-lift aircraft (24) may in effect operate as a tri-plane, having upper and lower wings, and along the gimbal plane, exhaust gases vectored as thrust or lift, as well as middle wings provided by airfoil-enclosed cockpit/payload enclosure (10) Pivot axles (52), i.e., the axles that allow the gimbaling interaction and may optionally encompass the prime mover(s) (36).

Also, an emergency ballistic recovery system can be provided that includes an automatic riser retractor configured to partially retract risers and/or a cable suspending at least a portion of a powered-lift aircraft (24) from a parachute or parasail canopy immediately following chute deployment. In addition, a second retraction stage may be added to further soften the landing, activated by a ground proximity sensor.

FIG. 21A shows a parachute deployment and retraction system, and FIG. 21B shows a parachute retraction mechanism.

The cockpit/payload enclosure (10) may also include an emergency ballistic recovery system including a parachute or parasail housed within a ballistic package (FIG. 21A) along with an expulsion propellant (46) such as a pyrotechnic or compressed gas charge (FIG. 21B). The ballistic package may be housed within the cockpit support (56). The emergency ballistic recovery system may also include an automatic retractor configured to partially retract a cable connected to risers suspending the powered-lift aircraft (24), or some portion thereof, from a canopy of the parachute or parasail as required to obtain a "full chute" as rapidly as possible, ensuring rapid canopy inflation, increasing the margin of safety, especially in low altitude deployment. In addition, a second retraction stage may be added to further soften the landing, activated by a ground proximity sensor.

Figure 22:
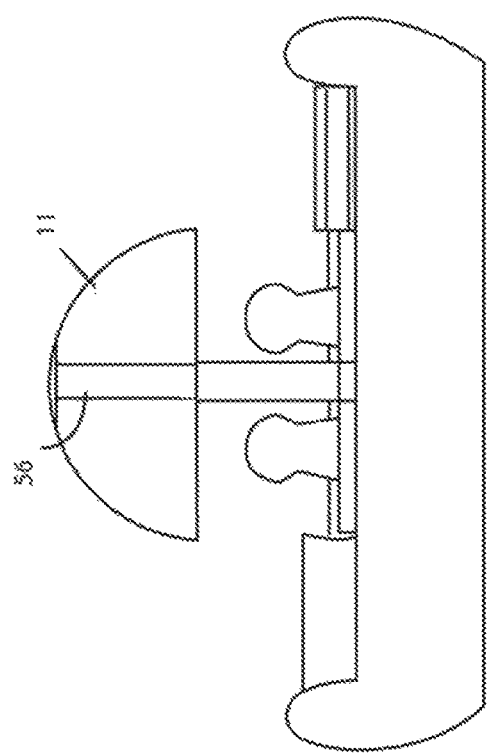
FIG. 22 depicts access and egress to and from the cockpit enclosure.

Referring now to FIG. 22, in certain embodiments, access and egress to and from the cockpit enclosure (10) may be accomplished by a stress bearing cockpit support 56, for example, which telescopes from a closed position to an open position. The cockpit payload enclosure (10) may be pivotally mounted to maintain a generally constant level attitude relative to the earth's surface whether the wing (60) and propulsion impeller ring (14) are oriented axially vertically for vertical, or near vertical flight or hovering (e.g., FIG. 1). The wing (20) and propulsion impeller ring (16) are oriented axially horizontally for translational or generally level flight (e.g., FIG. 2, or the wing (60) is transitioning between the axially vertical and horizontal attitudes.

The powered-lift aircraft (24) may include a cockpit payload enclosure (10) attitude control system that includes a cockpit payload enclosure (10) attitude drive operatively connected between the cockpit payload enclosure (10) and the wing (60), a controller connected to the attitude drive, and an attitude sensor such as a mechanical or ring-laser gyroscope. The controller may be programmed to maintain a longitudinal axis of the cockpit payload enclosure (10) in a generally level attitude relative to the earth's surface in response to signals received from the attitude sensor.

Relying on aerodynamics alone for vertical stability of a powered-lift aircraft (24) is not as stable as when relying on the positioning of the center of gravity of the powered-lift aircraft (24). For this reason, the powered-lift aircraft (24) may be configured to rely on the positioning of its center of gravity as the default source of vertical stability or orientation of the cockpit payload enclosure (10). For instance, in the embodiments where the cockpit (10) is fixed with respect to the axle (54), a pilot may rotate a lever that is fixed to the axle, thereby altering the center of gravity. Rotating the cockpit payload enclosure's (10) center of gravity forward causes the wing (60) to transition from an axially vertical attitude to an axially horizontal attitude for forward horizontal flight. Rotating the cockpit payload enclosure's (10) center of gravity backward returns to the wing (60) to an axially vertical attitude for hovering, vertical flight, and/or landing. Asymmetrical thrust can be achieved radially through differential pitch control which is another way to control the wing (60)'s aspect relative to its horizontal to vertical axis. The cockpit payload enclosure (10) may be maintained in a vertical attitude unless the powered-lift aircraft (24) is banking in a turn. However, in other embodiments the cockpit payload enclosure (10) may be supported in such a way as to be driven to rotate in any orientation and may include an attitude control system that provides whatever attitude is commanded.

Figure 23:
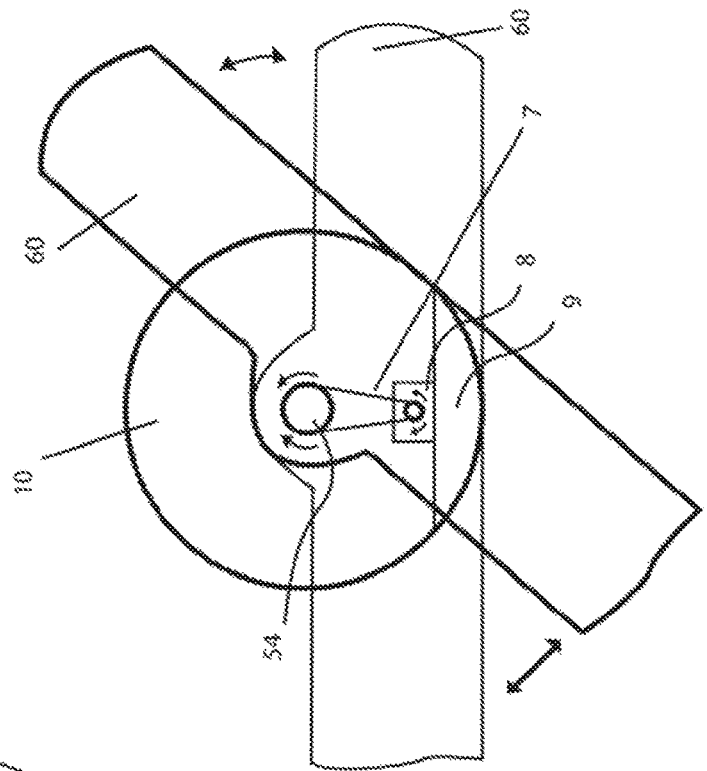
FIG. 23 depicts a wing tilt control including one or more belts having one end associated with the axle and another end associated with a pulley.

In certain embodiments, where the axle (54) rotates freely in a suitable bearing in the wing (60), as shown in side view in FIG. 23, the wing tilt control may include one or more belts (7) having one end associated with the axle (54) (which passes centrally through the cockpit payload enclosure (10))

and another end associated with a pulley (8), for instance, supported on a base 9 in the cockpit (10). The pulley (8) may be actuated, for example, to tilt the wing 60 to the position of wing (60').

Figure 24:
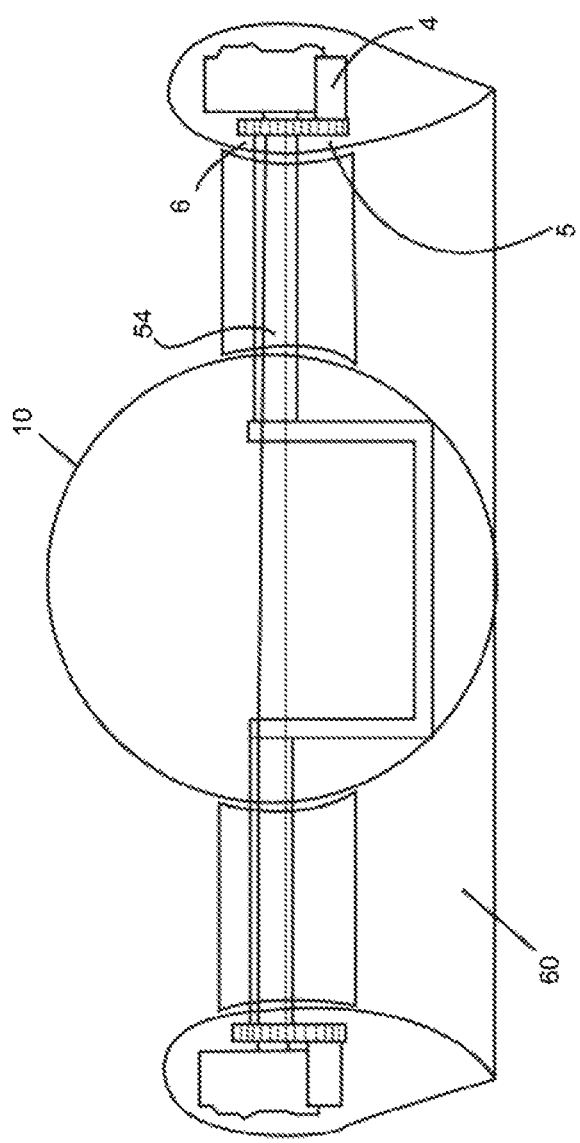
FIG. 24 depicts an axle including gear structures at the ends, which cooperate with pinions that are driven by an actuator.

In other embodiments, the axle 54 rotates freely through the cockpit, where it is controlled at the wing (60). For instance, as shown in FIG. 24, an axle (54) includes gear structures (6) at the ends, which cooperate with pinions (5) that are drive by an actuator (4). In this manner, the cockpit 10 may be rotated with respect to the wing (60).

Figure 25:
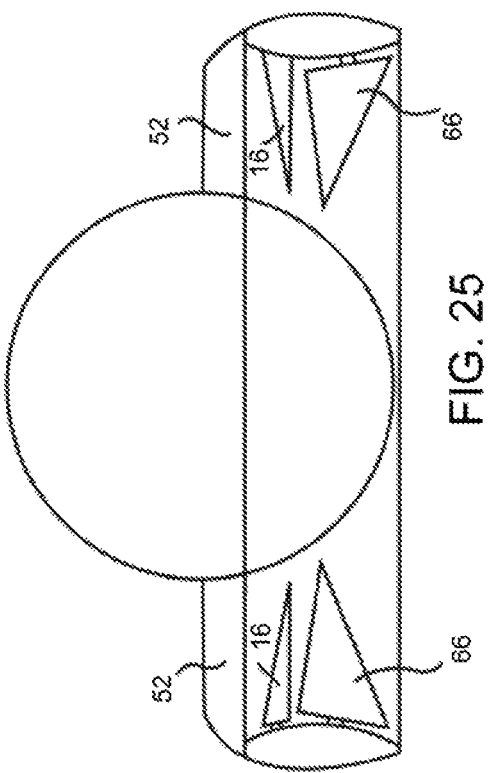
FIG. 25 shows rudders and blades extending radially inward from the propulsion impeller ring.
Figure 32:
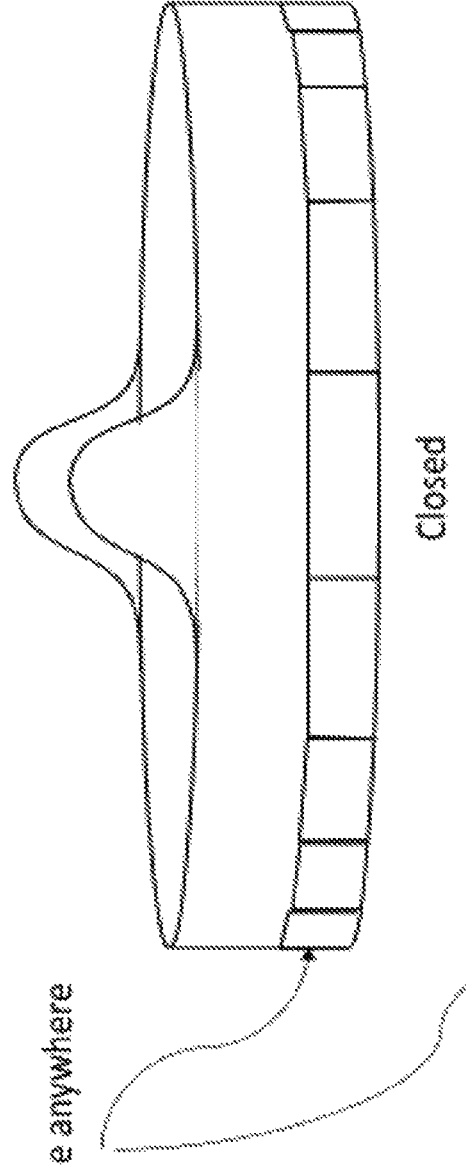
Figure 33:
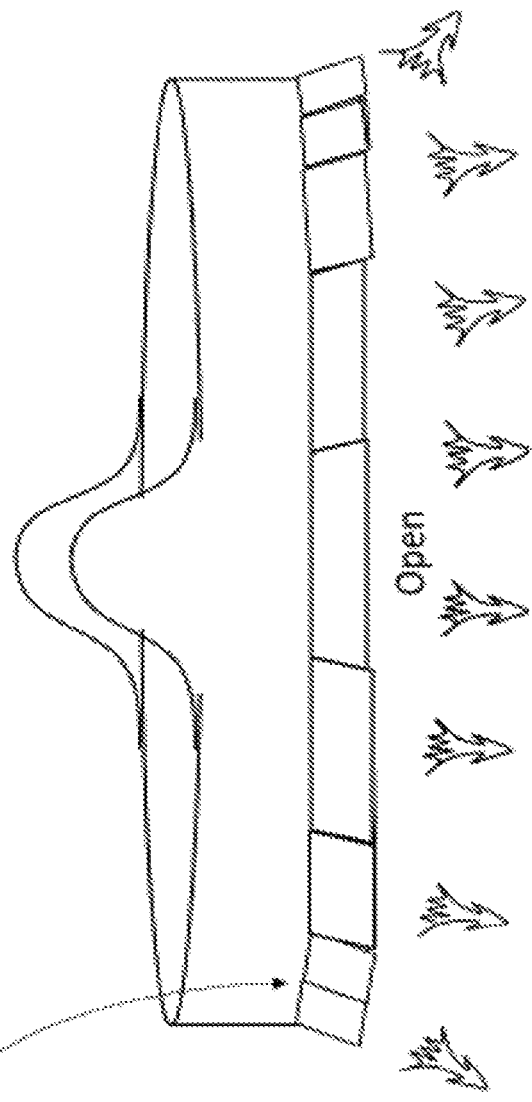
Figure 34:
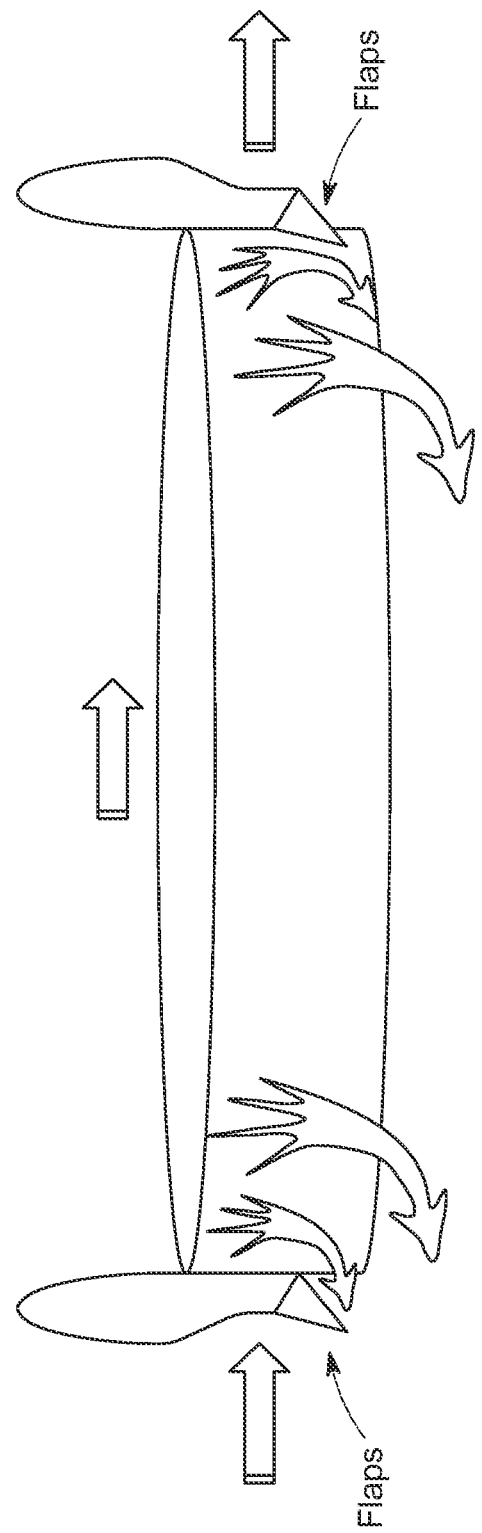

Various alternatives are possible. FIG. 25 shows rudders (66) and blades (16) extending radially inward from the propulsion impeller ring (14). Rudders (66) may be used generally as is conventionally known, to deflect air for steering, descent, ascent, and other various induced maneuvers. These may be used, for instance, in combination with the previously described control methodologies including impeller pitch control and/or wing tilt control.

Referring to FIGS. 26 and 27, another non-limiting wing configuration is shown. FIG. 26 shows a side view of the aircraft, and FIG. 27 shows a perspective view of a wing structure (1060) according to this embodiment. In general, the center of gravity of the cockpit (1010) is raised, for instance, by providing protrusions (1061) on the wing (1060). In this manner, the overall dimensions of the wing (1060) may be reduced. Also shown in FIG. 26 is a shroud (1055) surrounding the axle (1054), for instance, to provide an airfoil and serve as a middle wing in a tri-plane configuration discussed herein.

In other non-limiting embodiments, additional lift may be generated by redirecting the exhaust of the prime mover through a plenum in the gimbals axle and around the circumference of the cockpit payload enclosure, where the exhaust gases escape under pressure from actuated nozzles along the rear plenum of the cockpit payload enclosure, accelerated by incoming air scooped in along the leading plenum of the cockpit payload enclosure.

Using the disclosed powered-lift aircraft it is possible to experience powered-lift flight with a virtually seamless translation between vertical take off, hover, translation to aerodynamic, forward flight, with a return to hover and/or landing (VTOL). The load sharing axles of this powered-lift aircraft (24) share dynamic loads of weight, thrust, drag, and lift. The method of manufacture and the materials chosen may allow for low weight and high strength construction. A lower gross weight powered-lift aircraft (24) obviously requires less power, less fuel, and operates at lower cost. Also, unlike existing tilt-rotor VTOL aircraft that include axle-driven propellers and rotors that suffer from tip vortices thrust loss, a powered-lift aircraft (24) constructed according to the above-described embodiments will avoid such liabilities. The advantages and benefits of the disclose powered-lift aircraft can have significant military, commercial, and personal transportation implications.

Certain non-limiting benefits, features and/or advantages for one or more of the embodiments described herein can include, but are not limited to or required, the following:

1. Provides a method of powered-lift flight that includes creating vectored thrust sufficient to achieve powered-lift, where the thrust is generated by at least one impeller blade attached to at least one propulsion impeller ring, installed in a wing.

2. Proves at least one wing with asymmetrical aerodynamic lifting surfaces.

3. Provides at least one impeller blade inside the wing.

4. Provides at least one impeller blade mounted inside the propulsion impeller ring.

5. Provides at least one cockpit payload enclosure mounted generally within the axial rotation of the propulsion impeller ring.

6. Provides at least one load sharing axis, gimbals axle that connects the wing with the cockpit payload enclosure.

7. Transition of the vehicle's lift can be seamlessly shifted between the impeller blade(s) and the lifting surfaces of the wing, successfully transitioning from hover, where lift can be substantially generated by the impeller blade(s) to forward flight, where impeller blade(s) lift also becomes thrust, and can be substantially augmented by the lifting surfaces of the wing;

8. Flight control can be provided by a fly-by-wire system.

9. Forward flight can be accomplished without asymmetric rotor lift penalties associated with "leading and lagging rotor" lift scenarios of rotorcraft, where the wing being gimbaled at some aspect horizontal axis to gain advantage of its lifting surfaces while allowing the impeller blade(s) to generate horizontal thrust.

10. The cockpit payload enclosure can be provided in a position generally at the center of the propulsion impeller ring to provide controllability resulting from thrust being vectorable in all directions and to provide maneuverability due to the mass of the cockpit payload enclosure being in the center of the propulsion impeller ring and because the wing is free to gimbal around it.

11. A wing with aerodynamic lifting surfaces, at least one impeller blade attached to at least one propulsion impeller ring, installed in the wing; at least one cockpit payload enclosure mounted generally within an axial rotation of the propulsion impeller ring; where the wing, in vertical orientation, provides structural support for control and a substantially vertical airfoils configured to enhance the aerodynamic efficiency of hover and load transmission from the propulsion impeller ring to the cockpit payload enclosure. The wing, from a horizontal axis in the circular view, can include four quadrants including an upper aerodynamic lifting quadrant at the top of the wing, two side housing quadrants on either side of the wing, and a lower aerodynamic lifting quadrant at the bottom of the wing.

12. The side housing quadrants of the wing can house one or more components selected from the group of components comprising: at least one prime mover, a power transfer unit, fuel or energy storage, cockpit and/or payload, and flight-related components. Alternatively, the side housing quadrants of the wing can house one or more components selected from the group of components comprising: a jet turbine, a rotary engine, a motor, a battery, a fuel cell, a capacitor, compressed gas, a photovoltaic cell, a prime mover, a belt drive, a gear drive, an electric drive, a hydro drive, a gas drive, a traction/friction drive; nuclear fuel, liquid fuel, compressed gas fuel, solid fuel, a battery, electronics, avionics, landing gear, and a storage space.

13. The upper and lower quadrants can be configured to generate lift by means of angle of attack and an aerodynamic shape such that this section of the wing creates lift in the manner normally associated with a fixed wing, and such that the upper and lower quadrants can provide a bi-wing configuration in a flying duct.

14. The cockpit can be an airfoil-enclosed cockpit payload enclosure which can have pivot axles that may in effect operate as a tri-plane, having upper and lower wings as well as middle wings.

15. Additional lift may be generated by redirecting the exhaust of the prime mover through a plenum in a gimbal axle and around the circumference of the cockpit payload enclosure, where the exhaust gases escape under pressure from actuated nozzles along the rear plenum of the cockpit payload enclosure, accelerated by incoming air scooped in along the leading plenum of the cockpit payload enclosure. The additional lift can be created along the gimbal plane, as exhaust gases are vectored as thrust or lift, depending upon the orientation of the wing and the cockpit payload enclosure.

14. In the propulsion impeller ring, at least one impeller blade(s) can extend generally inward from upper and lower attach points and can be connected to the propulsion impeller ring at these points and can extend from the ring itself toward a center of rotation, thereby reducing or eliminating "tip vortices losses" associated with traditional propeller and rotor designs.

15. A moment of movement of the entire propulsion impeller ring is generally close to a center of lift of the impeller blade(s).

16. More than one propulsion impeller ring can be included in a powered-lift aircraft.

17. At least two of the propulsion impeller rings can be supported for counter-rotation.

18. Squash plates controlled by either rollers and/or air bearing and/or mounted billows configured to control the angle of attack of the impeller blade(s) can be provided, thereby imparting variable lift, rotational resistance, and gyroscopic procession forces.

19. One of the Rims may contain a different number of impeller blade(s) than another of the rims.

20. One of the propulsion impeller rings may support impeller blade(s) of differing design than the impeller blade (s) supported on another of the propulsion impeller rings.

21. The propulsion impeller ring can be rotated in a "E-shaped cross section" support cavity within the wing.

22. The propulsion impeller ring can be supported by one or more of the structures included in the group comprising: wheels, rollers, pulleys, rails, magnetic separation, air Bearings, or some combination of air, gas, and/or fluid suspension.

23. The propulsion impeller ring can be a component of an electric brushless motor.

24. The impeller blade(s) can be attached to the propulsion impeller ring and is configured to generate lift in a vertical axis, and to generate thrust in a horizontal axis, and some combination of lift and thrust in transition.

25. The impeller blade(s) can have a constant cross-sectional shape along its length, 26. The impeller blade(s) can have a consistent but tapered cross sectional shape along its entire length.

27. The impeller blade(s) can have an asymmetrical shape along its length.

28. The impeller blade(s) can have a curved shape along its length.

29. The impeller blade(s) can have a tapered shape along its length.

30. The impeller blade(s) can have a twisted shape along its length.

31. The impeller blade(s) can have a tapered and twisted shape along its length.

32. The impeller blade(s) can have no tip.

33. The impeller blade(s) can be connected in two places to the impeller blade.

34. The tip of the impeller blade(s) can be unconnected.

35. The tips of the impeller blade(s) can be connected to an interior propulsion impeller ring.

36. The tips of the impeller blade(s) can connect to each other.

37. The propulsion impeller ring can include upper and lower pitch control rings joined angularly on the ring's inner wall by attachment points to the impeller blade(s).

38. The cockpit payload enclosure may include one or more items selected from the group of items comprising: pilot and/or passenger seating, a first responder gurney, cargo space, ordinance and munitions, telemetry equipment, avionics, electronic warfare equipment, reconnaissance and surveillance equipment, broadcast equipment, advertising, network operating center hardware, a prime mover, fuel, and cargo.

39. The cockpit payload enclosure can be coated.

40. The cockpit payload enclosure can be pressurized.

41. The cockpit payload enclosure can be armored.

42. The cockpit payload enclosure can be transparent.

43. The cockpit payload enclosure is protected by polarization filters.

44. The cockpit payload enclosure can have a shape including one or more shapes selected from the group of shapes comprising: a sphere, a teardrop, an ovoid, and an ellipsoid, or any other enclosure shape that would fit within the void created by the orbit and gimballing of the impeller blade(s).

45. Load sharing axes that can be connection points and gimbals that can facilitate independent rotation of the wing.

46. Load sharing axes that can be connection points and gimbals that can facilitate independent rotation of the cockpit payload enclosure.

47. The load sharing axes can be configured to allow thrust created by the impeller blade(s) in the propulsion impeller ring to rotate around the cockpit payload enclosure.

48. A powered-lift aircraft that includes one or more propulsion impeller rings that are carried by a generally cylindrical wing and rotatably supported within a generally cylindrical cavity defined by the wing.

49. The propulsion impeller rings can be rotatably supported within the generally cylindrical cavity defined by the generally cylindrical wing.

50. The one or more propulsion impeller rings can be disposed between an inner surface of the wing and a cockpit payload enclosure that's surrounded by and pivotally mounted to the wing.

51. An attitude control system which can be configured to maintain a longitudinal axis of the cockpit payload enclosure in a generally constant level attitude relative to the earth's surface independent of the attitude of the wing.

52. An emergency ballistic recovery system that can include an automatic riser retractor configured to partially retract risers and/or a cable suspending at least a portion of a powered-lift aircraft from a parachute or parasail canopy immediately following chute deployment.

53. A generally cylindrical wing having a non-constant cross-sectional shape contoured to provide lift in at least one of an upper and a lower semi-cylindrical portion of the wing.

54. A propulsion impeller ring drive system supported within a generally cylindrical wing.

55. A propulsion impeller ring drive system that can include a propulsion impeller ring comprising a plurality of impeller blades pivotally supported on a ring for variable pitch control and can include an asymmetric impeller blade pitch control system operatively connected to the impeller blades and actionable to cause the propulsion impeller ring to provide asymmetrical thrust by individually and differentially controlling the pitches of the impeller blades.

56. An asymmetric impeller blade pitch control system comprising a pair of pitch control rings that sandwich impeller blades of a propulsion impeller ring and are asymmetrically manipulable in such a way as to cause the propulsion impeller ring to provide asymmetrical thrust through individual differential control of the pitches of the impeller blades.

57. Billow-mounted air bearings that can be disposed between the pitch control rings and the impeller blades.

58. A generally cylindrical wing housing a mechanically driven propulsion ring that derives power from at least one prime mover, and a mechanical drive operatively connected to the propulsion impeller ring and including one or more components selected from the list of components comprising of a belt-drive, a friction roller drive, a magnetic drive, an electric motor, a gear drive, and some combination of air, gas or liquid bearing drive.

59. A rotatable propulsion impeller ring drive system comprising contra-rotatable propulsion impeller rings supported by air bearings.

60. A method of controlling the attitude of an airborne vehicle by asymmetrically controlling the pitch of impeller blades.

61. An aircraft comprising: a toroid-shaped wing having an inner surface and with the wing defining a cylindrical cavity; one or more propulsion rings carried upon the inner surface of the wing; and at least one powerplant operably coupled to the one or more propulsion impeller rings to impart rotational force to the one or more propulsion impeller rings. wherein rotation of the propulsion rings causes thrust sufficient to achieve powered lift.

62. A cockpit payload enclosure surrounded by and pivotally-mounted to the wing with an axle structure that can be connected to opposing sides of the wing in gimbaled relation, the axle structure can be rotatably supported on opposing sides of the wing and fixed on the cockpit payload enclosure or rotatably supported on the cockpit payload enclosure and fixed on opposing sides of the wing.

63. The axle structure can be rotatably supported on opposing sides of the wing and fixed on the cockpit payload enclosure.

64. The axle structure can be rotatably supported on the cockpit payload enclosure and fixed on opposing sides of the wing.

65. At least one of the one or more propulsion rings includes at least one impeller blade.

66. During powered lift operations, rotation of the wing relative to the cockpit payload enclosure can change the direction of thrust.

67. During powered lift operations and in a configuration where the wing is non-vertical, the wing can provide additional lift.

68. The wing can include airfoil shaped sections.

69. A pair of propulsion rings can be provided that are supported for contra-rotation, each propulsion ring including at least one impeller blade.

70. One or more squash plates controlled by rollers, air bearing, mounted billows, or a combination of one or more of rollers, air bearing, and mounted billows, wherein the squash plates configured to control the angle of attack of the impeller blades, thereby imparting forces selected from the group comprising variable lift, rotational resistance, gyroscopic procession forces, and a combination comprising at least one of variable lift, rotational resistance and gyroscopic procession forces.

71. The cockpit payload enclosure can have a shape including one or more shapes selected from the group of shapes comprising: a sphere, a teardrop, an ovoid, an ellipsoid, and any other enclosure shape that would fit within the cylindrical cavity and not impaired by orbit and gimballing of the propulsion ring.

72. An attitude control system configured to maintain a longitudinal axis of the cockpit payload enclosure in a generally constant level attitude relative to the earth's surface independent of the attitude of the wing.

73. The cockpit payload enclosure can have a shape including one or more shapes selected from the group of shapes consisting of a teardrop, an ovoid, and an ellipsoid, and further wherein during non-vertical flight, the cockpit payload enclosure can serve as a middle wing in a tri-plane configuration.

74. An asymmetric impeller blade pitch control system including an apparatus for sandwiching impeller blades of the propulsion ring and for asymmetrically manipulating the impeller blades in such a way as to cause the propulsion ring to provide asymmetrical thrust through individual differential control of the pitches of the impeller blades.

75. The propulsion ring can be supported by one or more of the structures included in the group comprising wheels, rollers, pulleys, rails, magnetic separation, air bearings, and a combination of air, gas, and/or fluid suspension.

As seen in FIGS. 28 through 34, leading and/or trailing edge flaps preferably provided on the wing Structure can be provided as another control method. Thus, one or more flaps may be engaged to influence or redirect air flow. Multiple flaps can be utilized as a control authority, mechanism and may impart control forces such as torque, lift, breaking or shielding. This can direct thrust while grounded and hovering like a hovercraft just above a surface, in or out of ground effect or while flying forward. When hovering like a hovercraft, the flaps can act like a vent or gate and allow air to be expelled substantially in a direction opposite of desired drift. When hovering out of ground effect, the one or more flaps can aid in drifting sideways or "crabbing" while hovering or in transition to forward flight.

Though described above as flaps, the movable surfaces on the wings can be flaps, slats, ailerons, spoilers, etc. These movable surfaces can be located anywhere on the wing structure and may be activated using hydraulics, electromechanical motors, electrohydraulic combination systems, etc.

Figure 36:
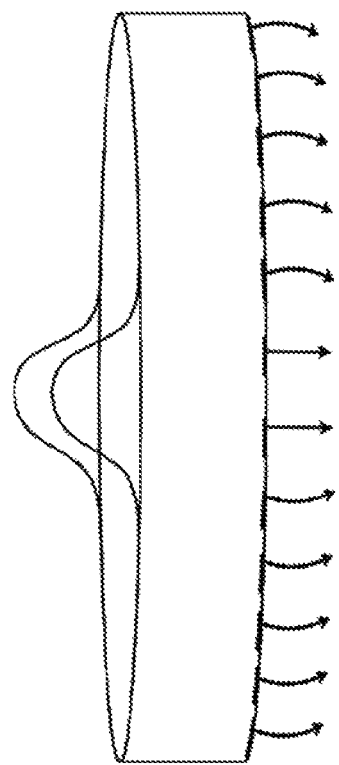
FIGS. 35 through 37 illustrate an airflow attitude control system that can be provided in accordance with the present disclosure.
Figure 37:
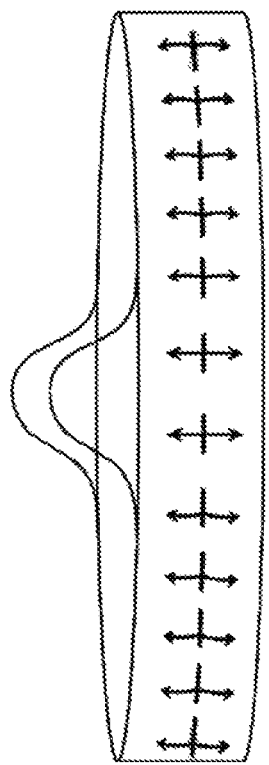
Figure 35:
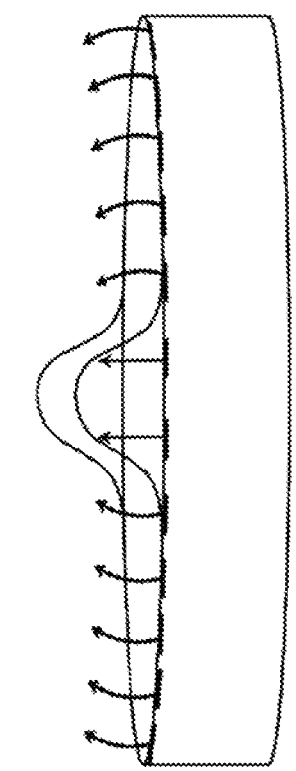
Figure 38:
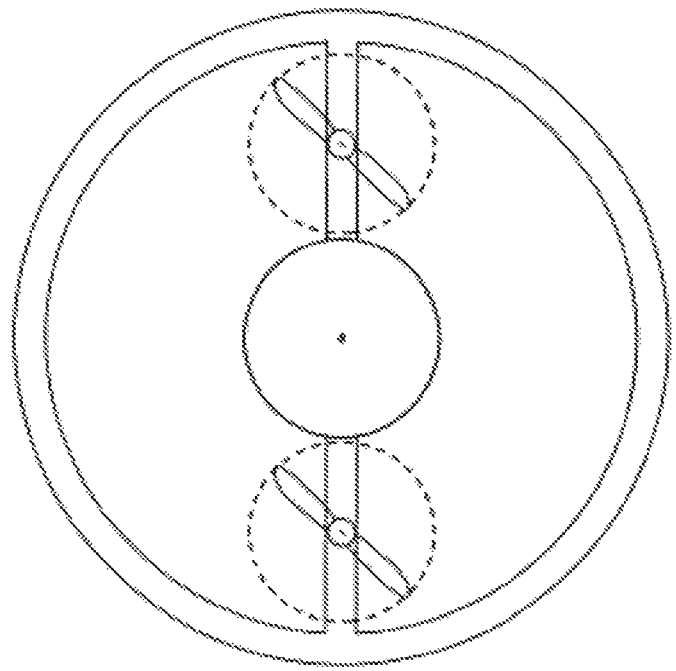
FIGS. 38 through 41 illustrate an embodiment where one or multiple propulsive units can be provided within the wing structure in accordance with the present disclosure.
Figure 39:
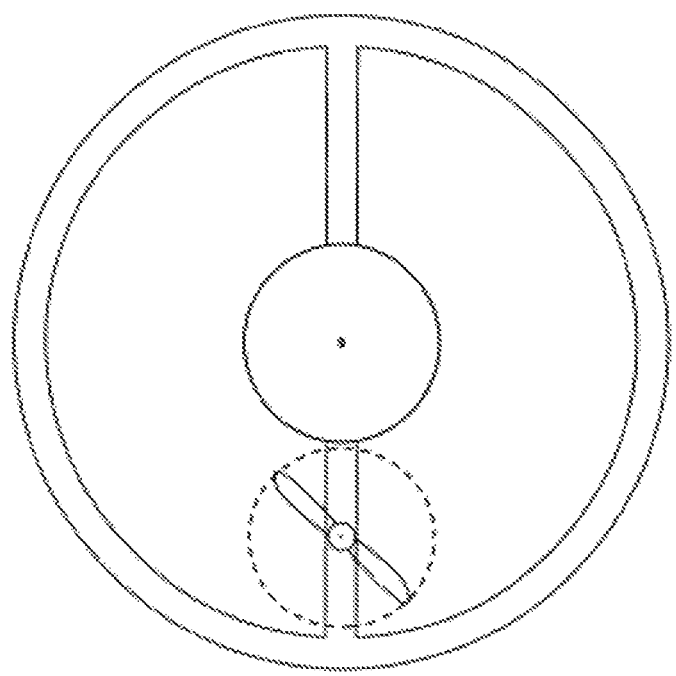
Figure 41:
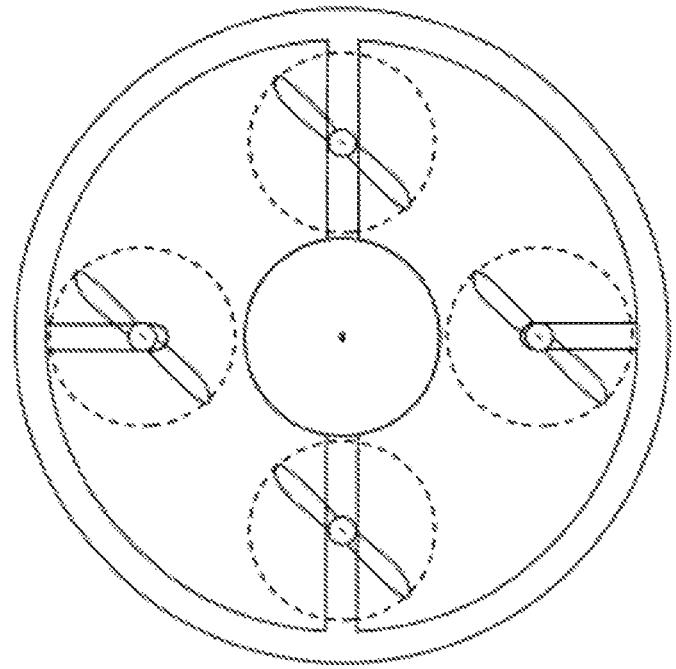
Figure 40:
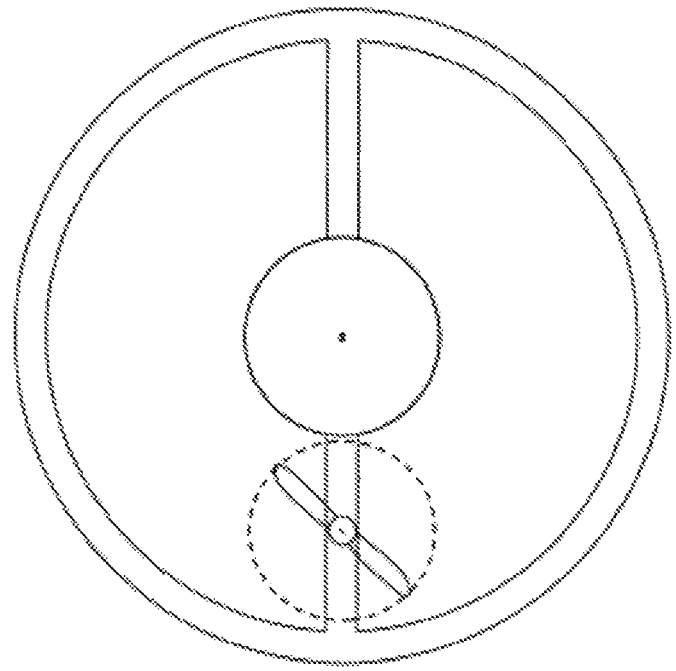
Figure 43:
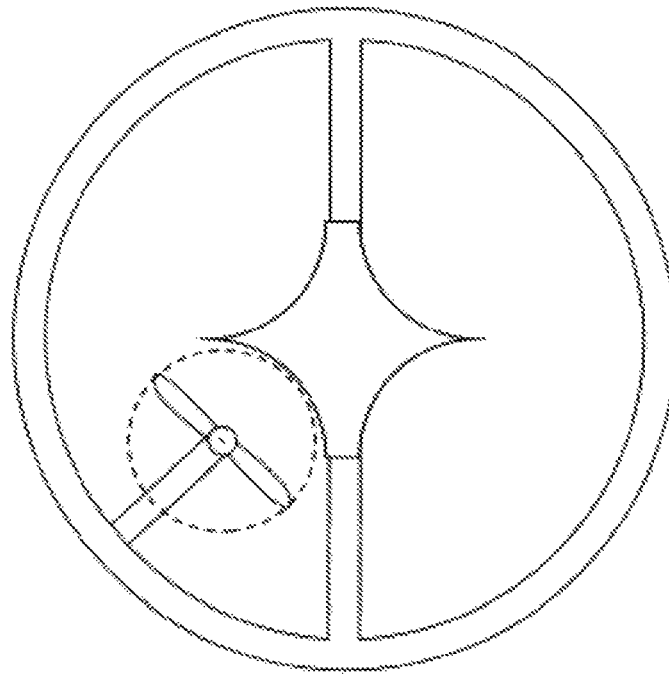

FIGS. 35 through 37 illustrate an airflow attitude control system that can be provided with one or more embodiments of the disclosed novel aircraft. As an alternative or in addition to movable surfaces on the wing structure (see FIGS. 28 through 34), the aircraft may use an attitude control system which can preferably use air blown from openings or vents on the wing structure. The bursts of air impart forces or alter the pressure differential around or over the wing structure through one or multiple air vents or outlets circumferentially positioned along the leading edge, trailing edge or anywhere within the duct housing, which may be employed either independently or collectively to maintain stability or affect maneuvers throughout various flight modes. The velocity of the airflow through the vents may also be adjusted, either independently or collectively, through valves, vanes or other methods. This attitude control method may use air deflected from the main propulsion system impellers, engine discharge or air generated through an electrically powered distributive airflow system housed within the wing structure. The airflow vents may be activated manually or through an automated fly-by-wire (FBW) system, which can use sensors to detect changes in aircraft flight orientation. Actuation of components may be accomplished through magnetic forces, pneumatics, hydraulics, electric-mechanical motors or an electro-hydraulics combination.

FIGS. 38 through 41 illustrate an embodiment where one or multiple propulsive units can be provided within the wing structure. The number of propulsive units is not considered limited to any particular value. As seen, one or more prime movers or propulsive units can be mounted centrally within the gap of the outer wing structure that can be suspended or affixed within the air stream or disc loading area. Any number of impellers with any number of blades can be used and located within the wing structure, preferably in a balanced arrangement, which may be used as a prime mover for main propulsion. These propulsive units can be attached to the airframe structure and powered by an electric motor, hybrid electric motor or combustion engine. The drive systems may include gears, belts, bearings, friction rollers or magnets.

Figure 42:
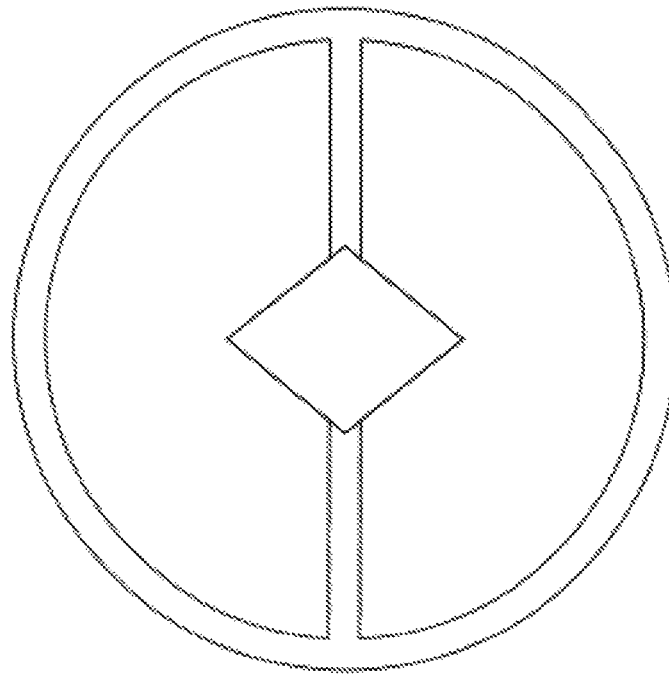
FIGS. 42 and 44 illustrate non-limiting examples for the shape and mounting of the cockpit enclosure in accordance with the present disclosure.
Figure 44:
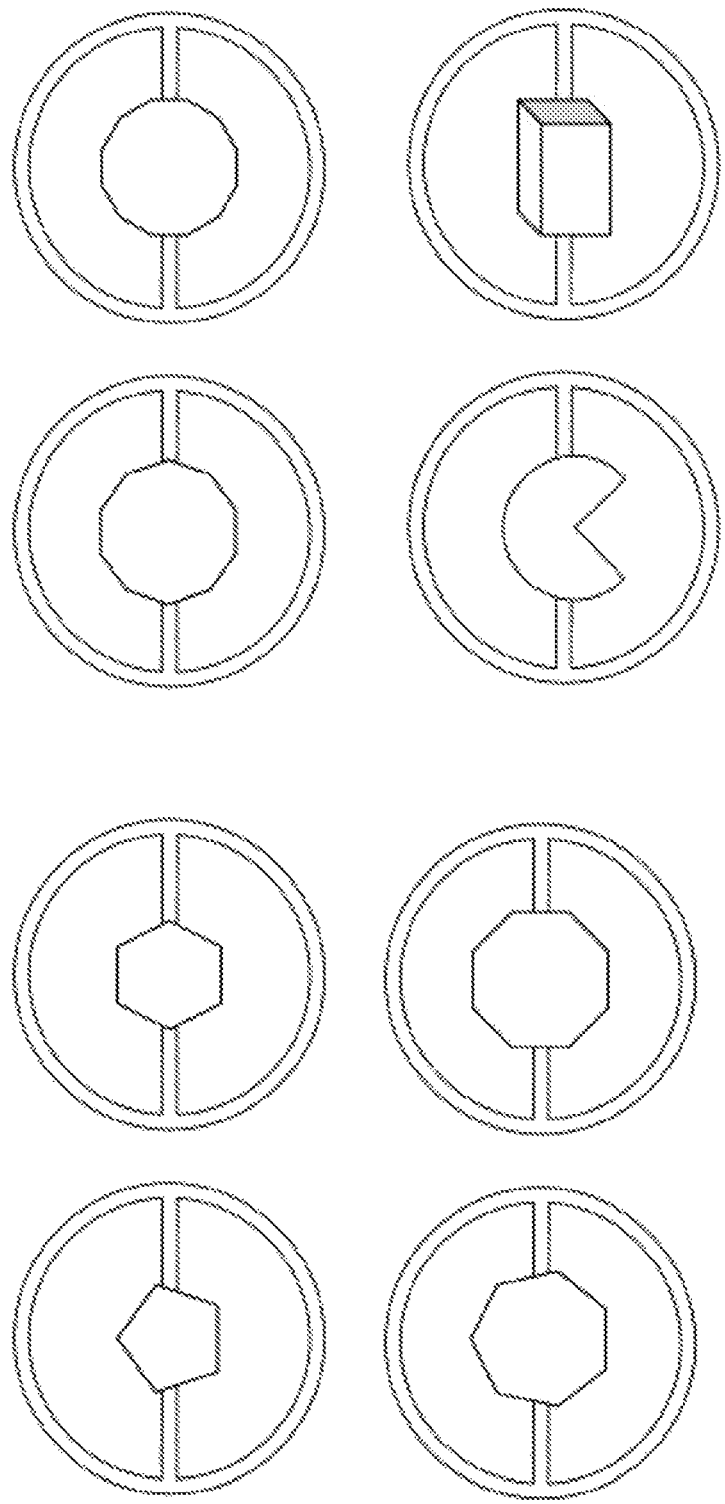

FIGS. 42 and 44 illustrate different non-limiting shapes and mounting for the cockpit enclosure. As seen, the cockpit payload may be composed of one or more shapes, structures or cavities that may also be composed of any shape, as viewed from a plan view (top down) or from the side that may be used to contain payload of software, hardware, fuel, batteries, energy storage, weapons, parachutes, passengers, cargo, etc. The shaped enclosure may or may not be pivotally mounted to the cross member suspending axle. The shaped enclosure can be mounted at a pre-determined angle of attack or fixed to the outer ring wing structure as to be structurally and dimensionally unified.

Figure 45:
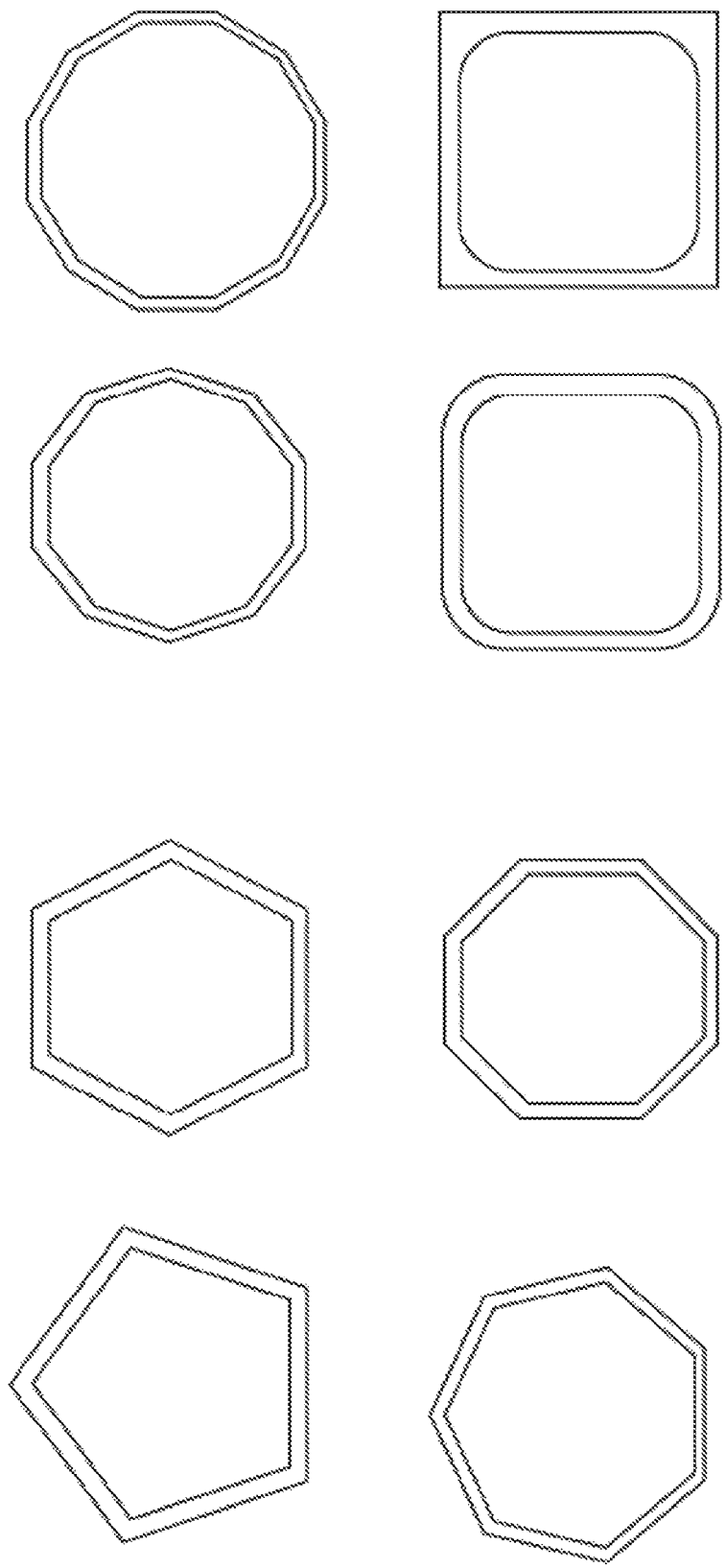
FIGS. 45 through 47 illustrate non-limiting example for the shape of the wing in accordance with the present disclosure.
Figure 46:
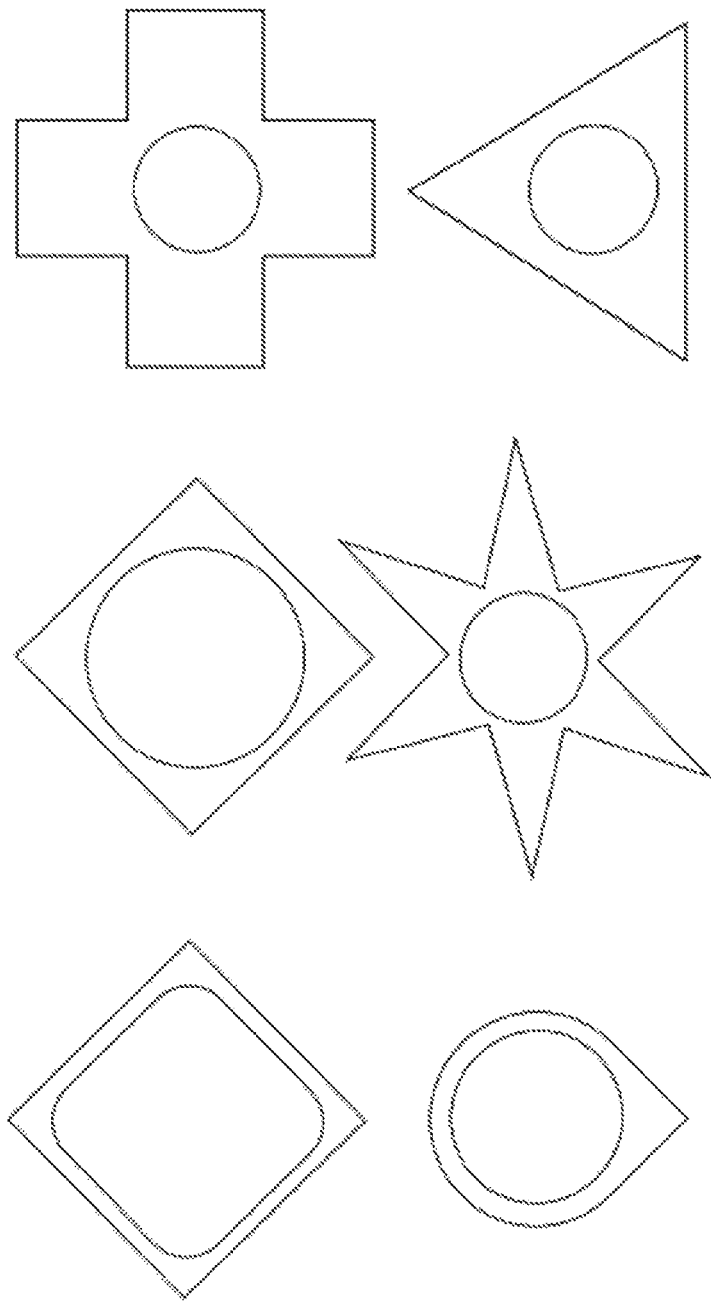
Figure 47:
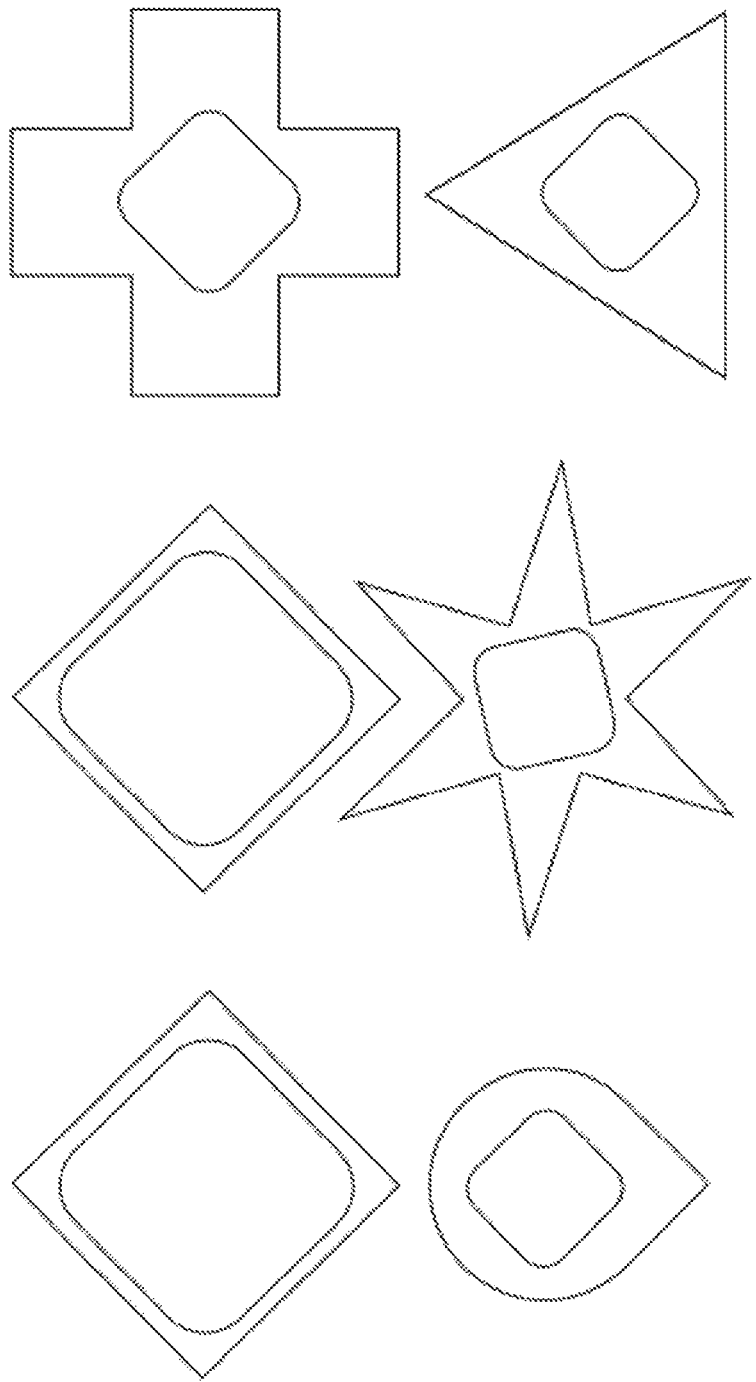

FIGS. 45 through 47 illustrate different non-limiting shapes for the wing, in addition to the shapes shown in the earlier figures. Thus, the outer wing structure area shape can be any shape that is preferably endless/continuous. Certain non-liming shapes shown, in addition to the earlier shown round or ring shaped, include without limitation, roundish, ellipse, oval, hexagon, octagon, polygon, pentagon, square, diamond, or any shape that may encompass via a radial plane inwardly the cockpit payload area."

FIGS. 48 through 54 illustrate wing-mounted ducted fans that can act as a drive system and/or to control attitude being provided. Thus, the primary central drive rim can also be driven via means of one or more drive motors, rollers, (wheels), drums, disks, gears or pulleys. The central area of the wheels may have spoke-like members, propellers or impeller blades designed to propel, force or thrust air and may be used as another means of aerodynamic control. For example, if three are dispensed 120 degrees apart on the outer rim/outer surface and are driven one or more by a prime mover, since they are radially outward of the rim, the ducted fans may have increased mechanical advantage or torque influence on the total wing structure. The ducted fans may also be enclosed in nacelle covers that can be opened and closed or flow reduced independently for precision control. Accordingly, the main impeller drive rim can be driven by the external ducted fans impellers rims in opposite direction, negating torque and inducing control influence, angle of attack, roll, yaw, speed, altitude. By friction driving the main impeller rim via the external ducted fan impellers, the fans can have more control leverage over the overall aircraft with a less complex drive system. The external drive impellers can also be individually steered or "valved off" by means of closing or constricting the air flow. This can cause the craft to have less lift in that duct section and can cause the overall aircraft to change its angle of attack.

The one or multiple ducted fans can be integrated into the wing structure within nacelles or affixed to the outside of the wing, likely in a balanced arrangement. The ducted fans can be activated independently or collectively and rotated in different directions. The airflow or thrust discharged at the ducted fan exits can also be used in aerodynamic control. These ducted fans can be powered by an electric motor, hybrid electric motor, combustion engine, etc. The drive systems may include gears, belts, bearings, friction rollers or magnets.

Figure 48:
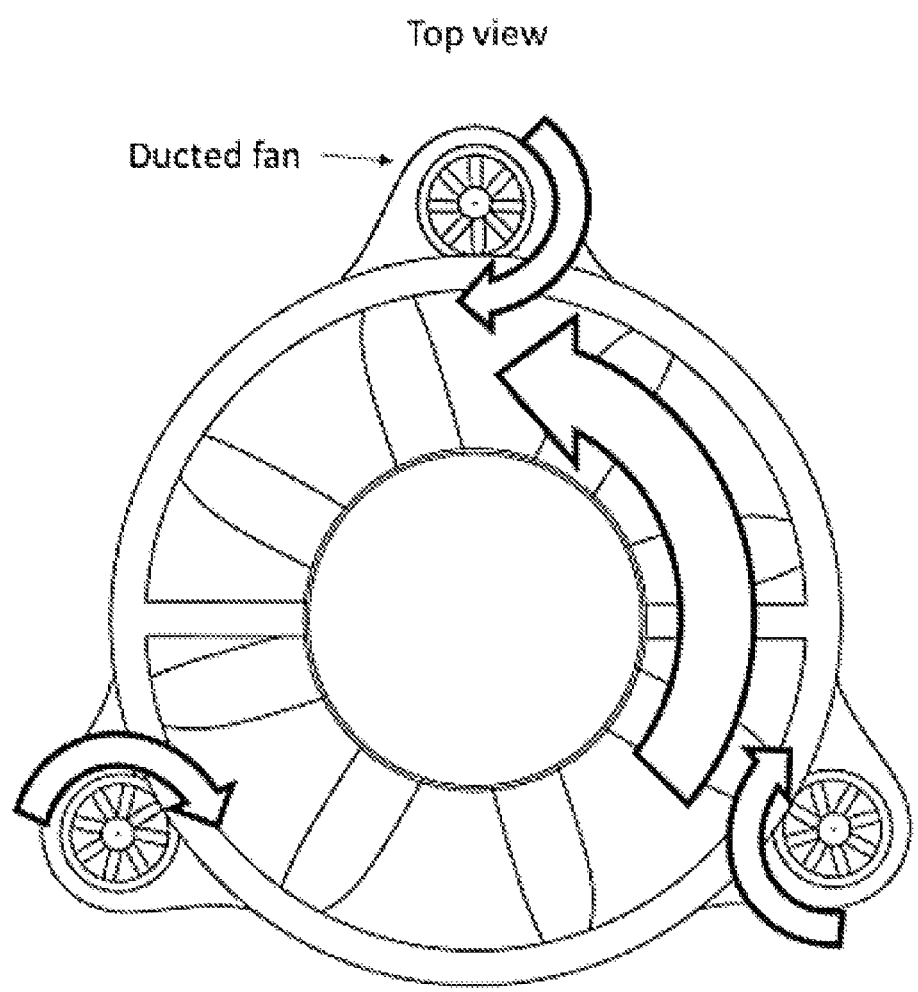
FIGS. 48 through 54 illustrate wing mounted ducted fans that can be uses as a drive system and to control attitude in accordance with the present disclosure.
Figure 49:
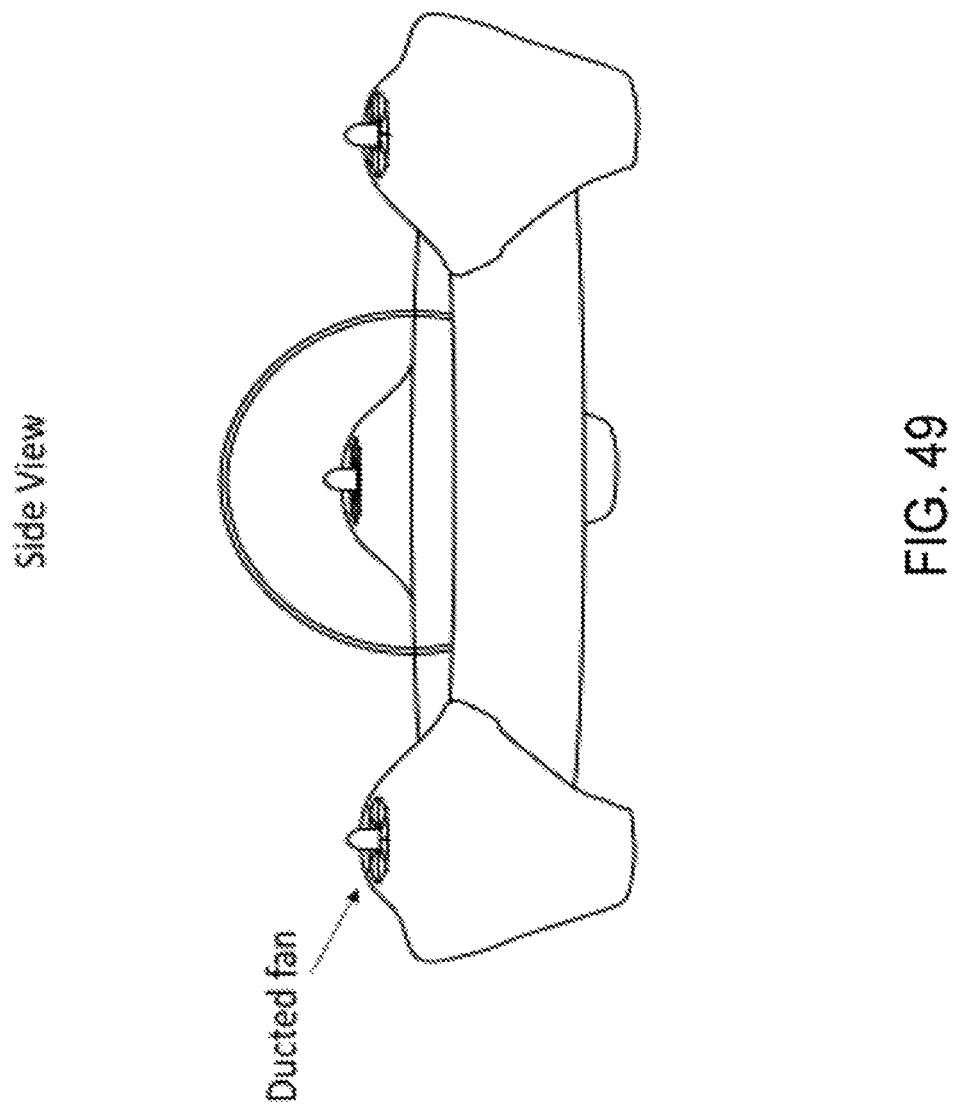
Figure 50:
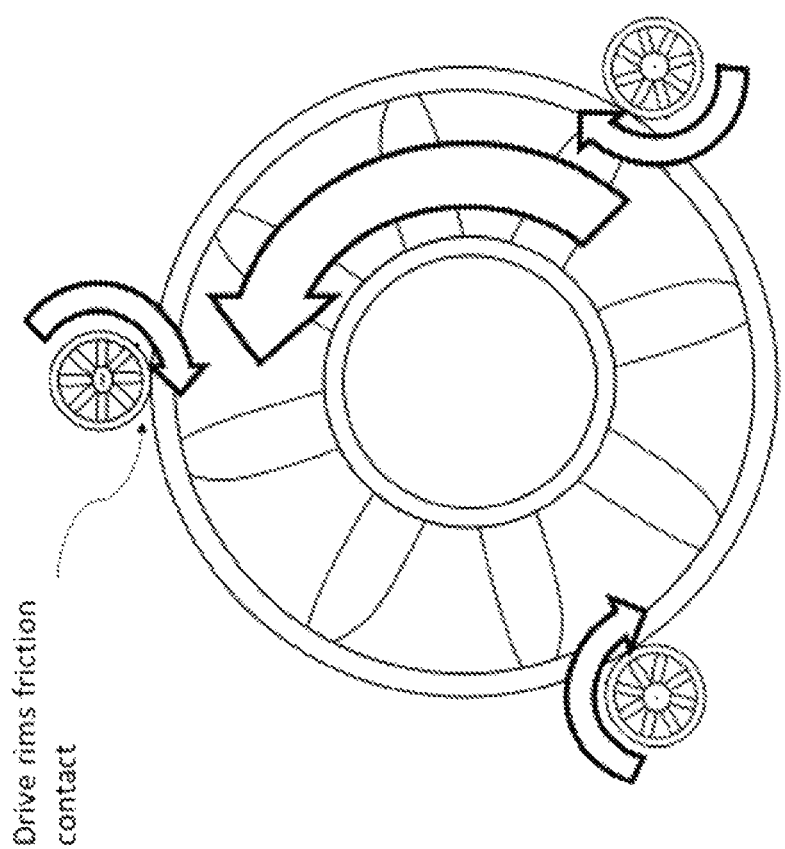
Figure 51:
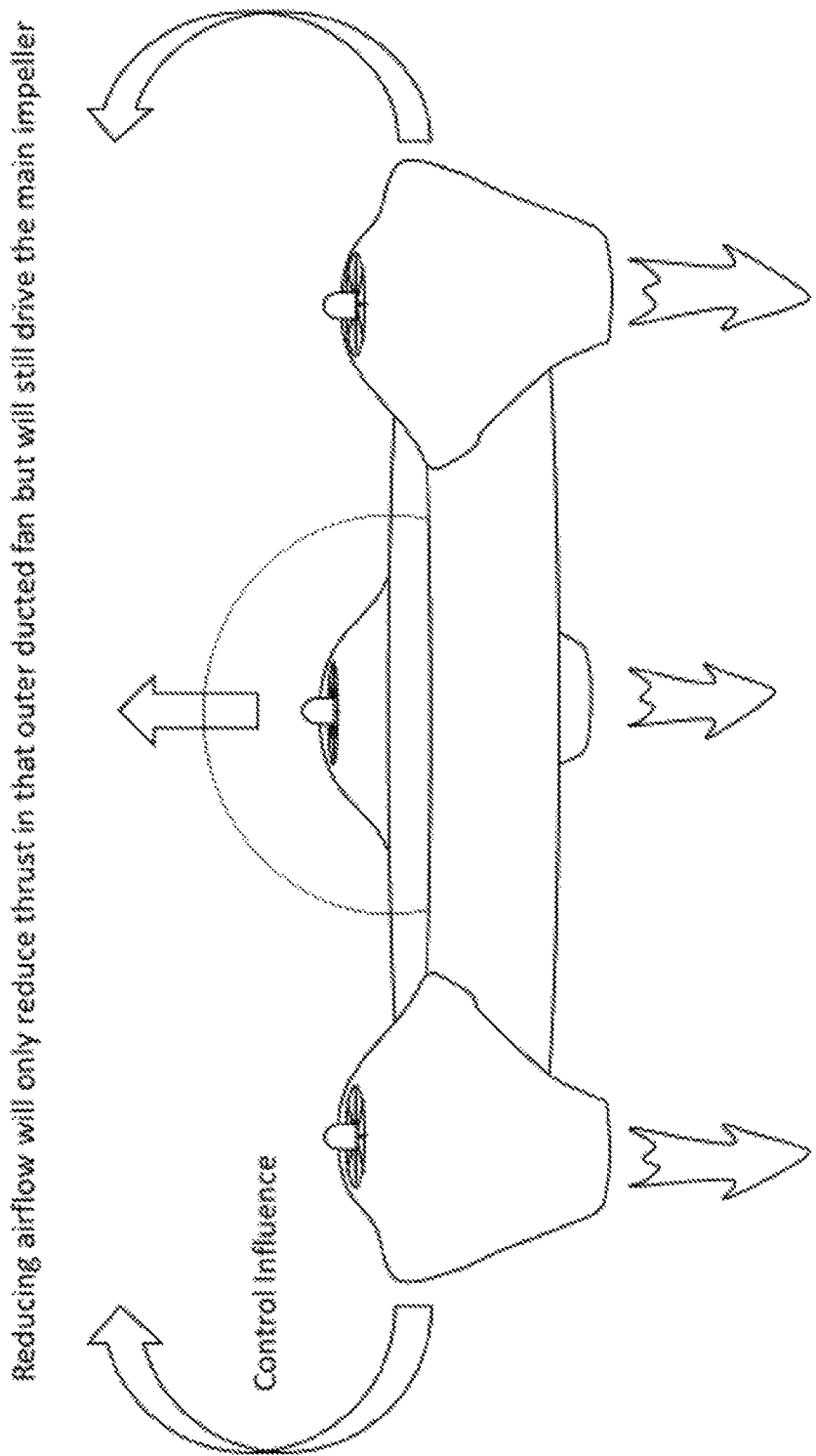
Figure 52:
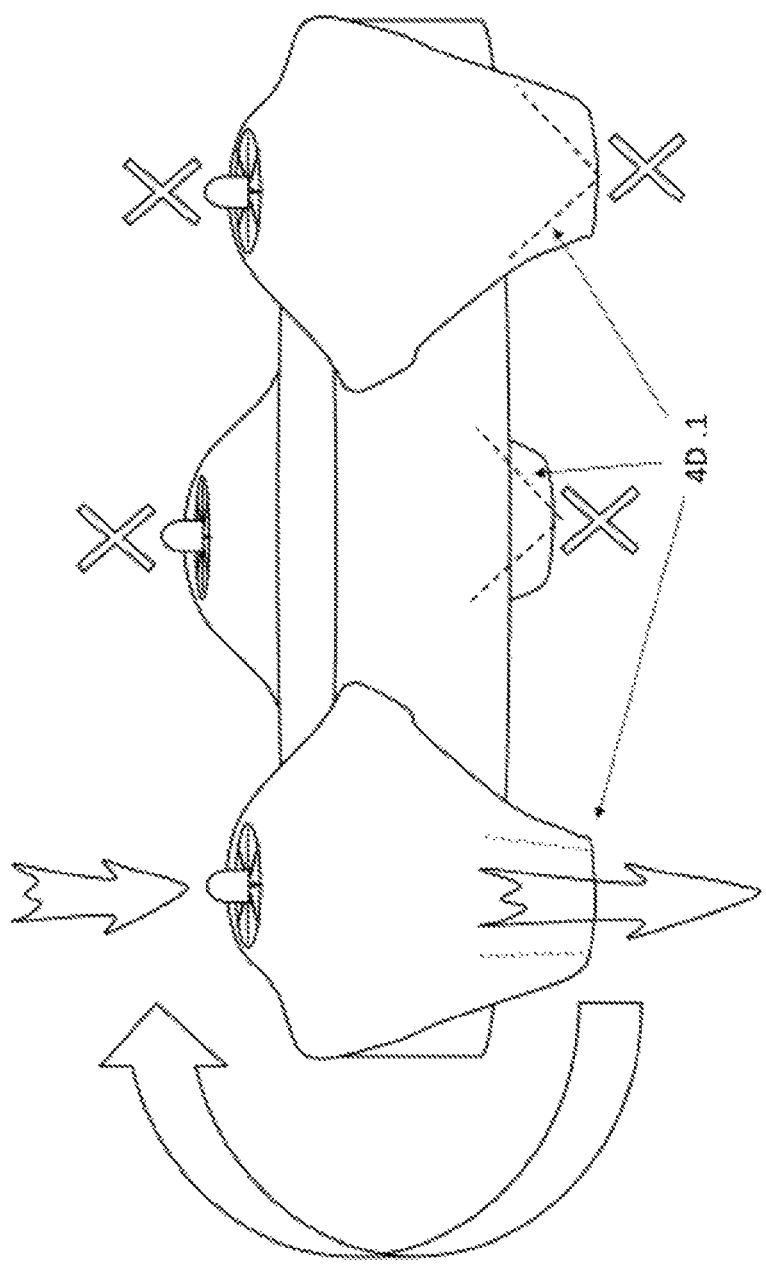
Figure 54:
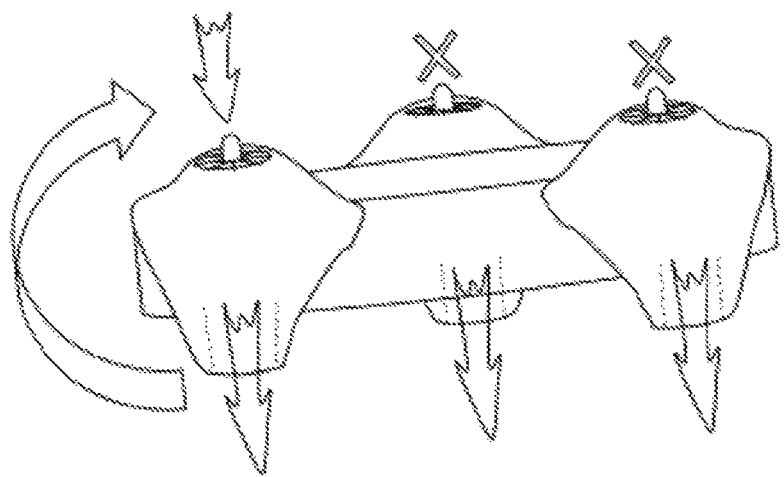
Figure 53:
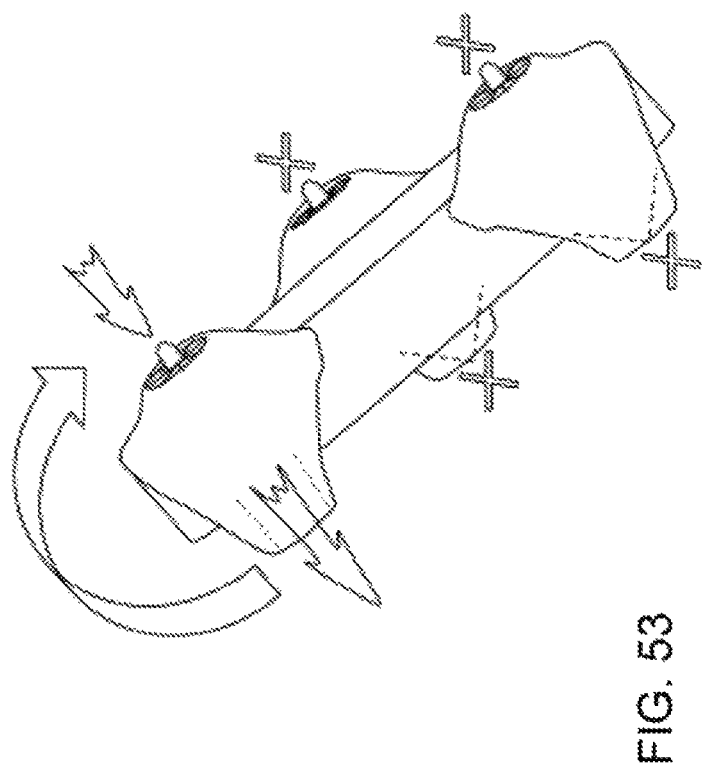

As also seen in FIG. 48, the main impeller drive rim is driven by external ducted fans impellers rims in opposite direction, negating torque and inducing control influence, angle of attack, roll, yaw, speed, altitude. By friction driving the main impeller rim view the external ducted fan impellers, the fans have more control leverage over the overall aircraft with a less complex drive system. The external drive impellers can also be individually steered or "valved off" by means of closing or constricting the air flow. This will cause the craft to have less lift in that duct section and will cause the overall aircraft to change its angle of attack.

Figure 55:
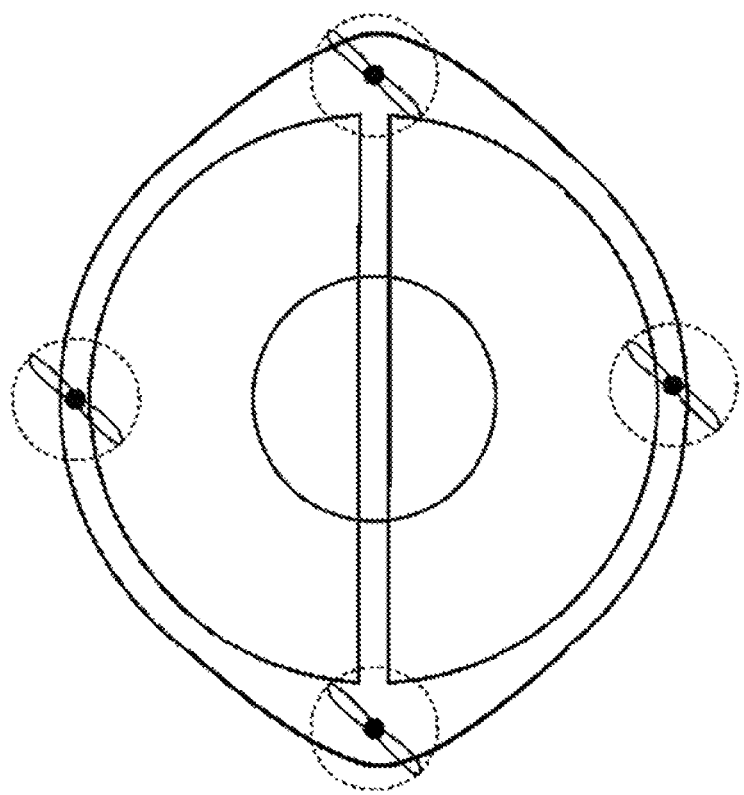
FIGS. 55 through 57 illustrate wing mounted propellers to control attitude in accordance with the present disclosure.
Figure 56:
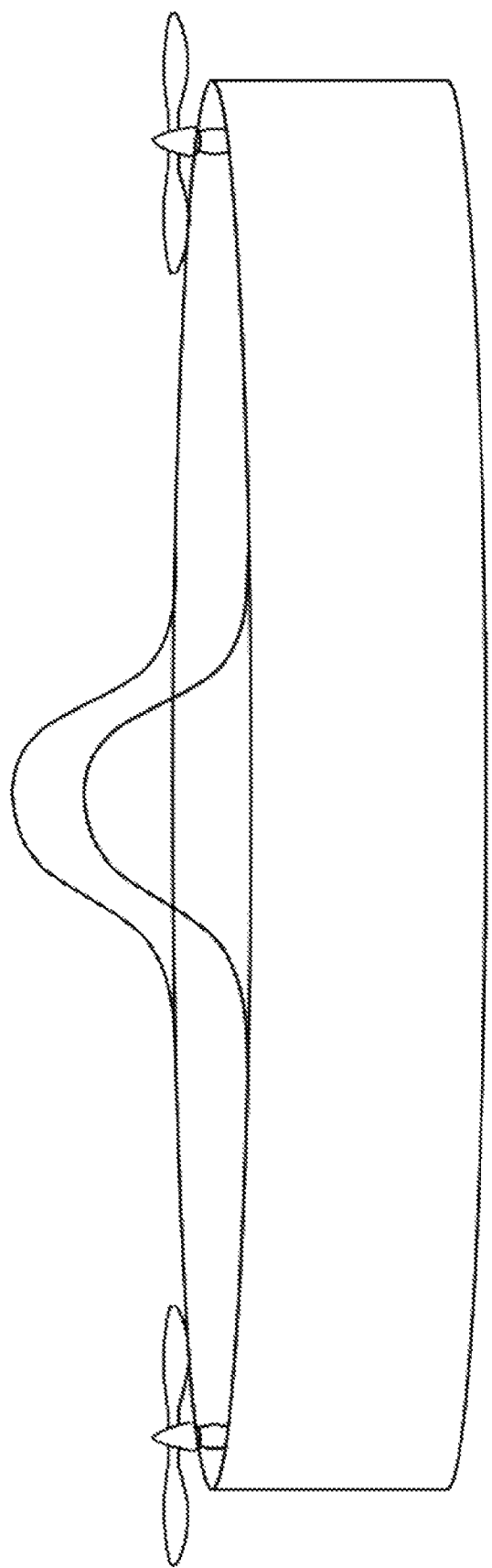
Figure 57:
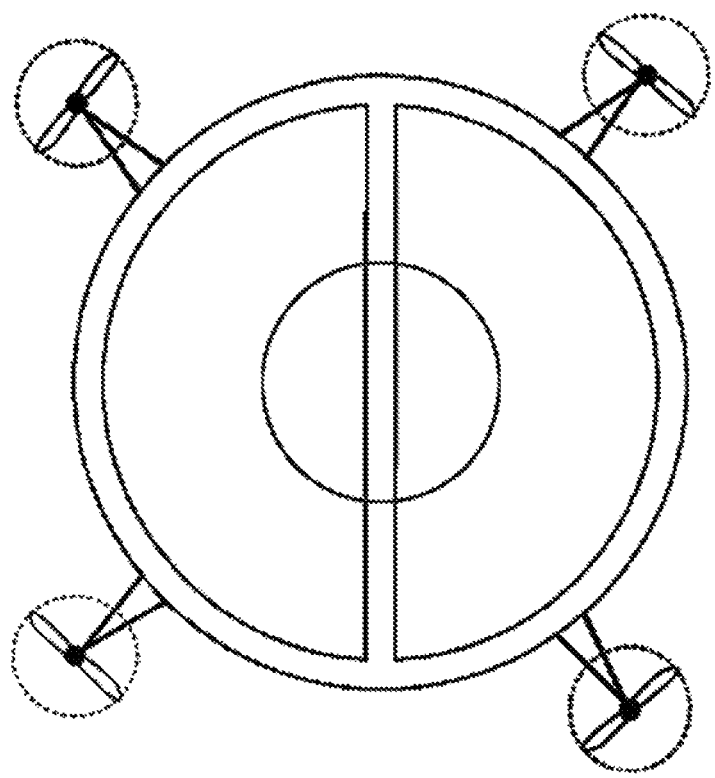

As seen in FIGS. 55 through 57 wing-mounted propellers can be provided to control attitude. The wing mounted propellers can be provided as an alternative to the wing-mounted ducted fans in FIGS. 48 through 54, can comprise one or more open rotors or propellers that can be mounted on the wing structure, fixed or pivotally, likely in a balanced arrangement, for attitude control. The propellers may be independently or collectively activated, and can have tilting capability, which may be actuated using magnetic forces, pneumatics, hydraulics, electric-mechanical motors, electro-hydraulics combination, etc. Power can be supplied by electric motors, hybrid electric motors, combustion engines, etc. The drive systems can include gears, belts, bearings, friction rollers or magnets.

As described and shown, the novel device provides for a powered lift ducted fan system which can allow for a seamless transition from vertical to forward flight with operational flexibility. The device can be preferably provided with a rotatable ring-wing, dual shrouded contra-rotating impellers, a central axle-mounted payload compartment and the ability to take off or land on almost any surface, including water. As a scalable and multi-purpose platform, the novel aircraft's size and capabilities can be expanded depending on the mission requirements, from a small frame UAV (or drone) to potentially a heavy lift cargo and even passenger transport aircraft, either manned or unmanned.

In certain embodiments, the device can be a relatively small, high-performance UAV, which can primarily be used for consumer and commercial applications and can feature a globular, high visibility medial fuselage, designed for hemispherical viewing. Improved safety on the ground, low noise levels and the ability to operate in more confined environments can be provided. In other embodiments, a larger scale, optionally piloted version can be provided to address non-limiting markets such as urban air taxis, rapid cargo delivery services and personal flying vehicles. In a further embodiment, a wedge-shaped aerodynamic fuselage can be provided for greater speed and stealth and can be for military applications though such use is not considered limiting.

The aircraft can be a powered-lift flying vehicle preferably incorporating a VTOL platform for relatively seamless transition from vertical to forward flight. As a preferably scalable system, the aircraft can be configured for different sizes depending on the application, such as, without limitation, from a small frame UAV to a large frame, piloted heavy lift or passenger transport aircraft.

The aircraft can include a ducted fan propulsion, an annular wing (ring-wing), a central cockpit/payload compartment or fuselage, and a load-sharing axle which can bridge the annular wing and fuselage. The payload compartment, can be either fixed or pivotally mounted on the axle, preferably maintains a generally upright orientation under normal operating parameters through an attitude control system using gyro-assisted stabilization technology, and through weight distribution, by positioning its center of gravity or balancing point generally in the lower half. This central payload section can take any number of shapes including, without limitation, spherical, oval or even teardrop, which approximates an airfoil with the characteristics of a lifting body. The annular wing can serve as the duct for the impellers, providing lift through its aerodynamic surfaces in the upper and lower quadrants, and directional control through its ability to partially rotate around the fuselage, along with the impeller rings, to change thrust vector and angle of attack. Lift produced by the airfoil wing structure can equal or exceed lift generated from the impellers in forward flight. To actuate the pivoting of the wing on the axle, a hydraulic or otherwise powered wing tilting gear mechanism can be used, the components of which can be housed in nacelles, the raised areas at opposing ends of the wing. The transverse axle can function as a structural support and can be fitted with movable aerodynamic surfaces to become a middle wing or an attitude control device by deflecting airflow. The leading edges of the wing, control surfaces and sections of the fuselage may be scalloped to improve efficiency. These protruding ridges, which can be referred to as tubercles, can reduce drag and increase lift. Other flight dynamics can be managed by adjusting the preferred independently operated impellers, using cyclic and collective pitch controls, similar to those on conventional helicopters. Small frame UAV models may use fixed pitch contra-rotating impellers. Another complex system for maintaining lateral stability can include the use of actuators to impart active differential thrust, called distributed electric propulsion, which generates moments by accelerating air around key points on the aircraft. Another embodiment can augment pitch and roll control through the addition of independently actuated thrust deflector vanes or control surfaces just beneath the impellers toward the duct exit. In addition to increased efficiency from shared disc loading, the dual contra-rotating impellers, rotating in opposite directions, has the advantage of balancing the effects of torque. Ducting or shrouding the impeller blades within the ring-wing structure can also be provided to provide the aircraft with the ability to operate in closer proximity to obstacles. such as buildings, which expands its applicability in urban environments. The ducted fan also can deliver significantly greater static thrust, and therefore higher efficiency, when compared to open rotors of similar diameter. The duct prevents losses in thrust from the tips of the propeller (i.e. blade-tip losses) and allows for a higher operating rotational speed. Compared with open rotor aircraft, the disclosed aircraft can have greater operational flexibility and a smaller logistical footprint, with superior maneuverability, speed, safety, noise levels and efficiency. In its amphibious embodiment, the disclosed aircraft can have the ability to take off or land on almost any surface, including water, through flotation of the annular wing and fuselage.

Payload, range and speed requirements of the disclosed aircraft, as well as other operational considerations, can determine the type of propulsion system (prime mover) and energy source, that is chosen for a particular embodiment of the disclosed aircraft. The propulsion system may include combustion engines that can run on jet fuel, gasoline, natural gas, propane, hydrogen and biofuels, hybrid-electric motors, or electric motors that use hydrogen fuel cells or lithium-ion batteries, possibly in combination with supercapacitors. Supercapacitors can boost power during flight and quickly recharge by capturing and storing excess energy. As battery energy density continues to improve, hybrid-electric or fully electric power systems can become more feasible for short range and even extended range aircraft. Various configurations of gear, belt, friction or other drive systems may be used to turn the impeller rotor(s). In one embodiment, a scalable drive system with a ring-shaped architecture (i.e. "hubless motor," "shaftless motor,". "rim-driven system," etc.) can be used. In this type of electromagnetic drive system, the rotational force that drives the impeller can be generated through the interaction of circumferentially arranged permanent magnets attached to the outside of the impeller ring (rotor) and a stator integrated into the surrounding structure and not through a mechanical link such as a shaft or hub.

The disclosed aircraft platform can be designed to rebalance the center of thrust, lift forces and distribution of pressure in certain flight conditions, particularly during the shift from hover to forward flight, through coordinated incremental adjustments to engine thrust, impeller blade pitch, control vane deflectors and wing orientation. The aircraft can maintain equilibrium through center of gravity and gyro-assisted stabilization of the payload compartment. Implementing active flow control actuators, air injection outlets circumferentially positioned within the interior of the duct, can also be provided to augment traditional trim control methods. Leading-edge flow control mechanisms can use either steady or synthetic jets of high-pressure air blowing outward toward the direction of the oncoming wind, separating the airflow over the duct lip. A side effect of this leading-edge flow separation can be a lowering of thrust, which may require additional propulsive power in proportion to increases in flight speed. Installing flow control actuators near the trailing edge of the duct, blowing air toward the duct exit, uses a Coandă surface to expand the airflow leaving the duct and does not negatively affect thrust. Each of these configurations has its advantages, with leading-edge flow control being preferred at higher angles of attack, and the two techniques may be used simultaneously or independently.

The disclosed aircraft can be designed for increased safety, reliability and efficiency while preferably matching or exceeding performance levels of existing VTOL aircraft in terms of range, maneuverability, logistical footprint, payload, ceiling, operational flexibility and speed. The disclosed aircraft can incorporate some level of AI technology in its unmanned, optionally-manned and piloted aircraft through an intuitive or adaptive flight control system, including through the use of one or more sensors on the aircraft for collecting data.

As a failsafe, the disclosed aircraft may include dual engine systems, each of which can individually supply adequate thrust for normal lift and flight, and modular redundancy in all safety-critical systems, including electronic displays, electronic flight controls and certain mechanical components. For additional safety, a ballistic recovery parachute can be installed in manned versions of the aircraft, preferably located in the center compartment dome. In emergency situations, such as incapacitation of the pilot or if the aircraft is unable to fly, a rocket-powered parachute can be deployed, and the aircraft can slowly descend to the ground.

The disclosed aircraft can be capable of launching from or landing at almost any location and without runway infrastructure and can provide for direct point to point flights. nd landing, eliminating this process can be a major safety advantage. The disclosed aircraft's preferred relatively compact VTOL format with ducted fan blades has the advantage of greater safety on the ground and within more confined environments, with lower noise and vibration, s compared to traditional helicopters.

There are numerous potential applications in military and commercial aviation for the disclosed aircraft platform, in unmanned or manned configurations. As one non-limiting example, in military aviation, the aircraft can be purposed for missions ranging from ISR to combat support, with mounted weapons systems and the ability to deliver ordnance, including missiles, bombs and rockets via the payload area or wing structure. The ISR aircraft may be mounted with radar, sensors and camera systems to transmit real-time data and imagery. The aircraft can also be used in explosives detection or to support secure wireless communications. In another embodiment/application, a personnel and heavy lift cargo transport aircraft can be designed to deliver troops, equipment and supplies or for insertion/extraction pararescue (PJ) operations. The ability to fly at low altitudes and in confined environments, close to buildings and terrain with elevations where radar is ineffective, makes the disclosed aircraft useful in many military missions. In addition, to further evade detection or interception, the aircraft can be optimized its stealth properties on its military aircraft. The device can inherently have low infrared (IR) emissions a low acoustic and vibration signature with internally housed propulsion systems and ducted impellers and can reduce its radar profile through the use of radar-absorbing materials and IR-suppression techniques. In an amphibious embodiment, with VTOL on water, adds another dimension to the military uses of the disclosed aircraft. In another embodiment preferably for the military (though not limited thereto) the aircraft can have a low-profile, wedge-shaped payload area or fuselage.

In the commercial sector, the disclosed platform can be used for aircraft ranging from small frame UAVs to large scale manned and unmanned passenger or cargo aircraft. In a small UAV format, the disclosed aircraft can carry a variety of payloads for a range of applications, including, without limitation, package delivery, security, surveillance, detection, exploration, inspection, mapping or aerial imagery. As a larger aircraft, the disclosed aircraft can be designed for low-altitude, local transportation purposes as either an air taxi, personal flying vehicle or a short haul cargo aerial vehicle, an area of aviation called urban air mobility (UAM). The disclosed aircraft can also be used for recreational purposes and personal enjoyment. In one embodiment for commercial purposes the disclosed aircraft can have a spherical payload area or fuselage.

One or more of the following components or features can be provided in at least certain embodiments such as, without limitation, a payload compartment, central axle, ring wing and impeller powered with remotely controlled battery powered motors and a gear drive system. In certain embodiments, a spherical center compartment can be provided, such as, without limitation, in certain commercial applications as UAVs and short haul passenger transport. In other embodiments, a wedge-shaped aerodynamic center compartment which approximates an airfoil can be provided and can be intended for military operations, though such is not limiting. Each of the configurations can be scalable and may be used for unmanned or manned systems.

Though not limiting, as mentioned above, preferably for military applications, the aircraft can have an airfoil shaped fuselage or payload compartment to reduce drag and provide for a reduced radar profile. The aircraft may carry a range of payloads, including, without limitation, HD video cameras, electro-optic/infrared (EO/IR) sensors, communications relay equipment, Lynx multi-mode all weather radar, synthetic aperture radar (SAR), active electronically scanned array (AESA) radar, signal intelligence (SIGINT), thermal imagers, laser designators, range finders (LDRF), hyperspectral systems, electronic intelligence (COMINT and ELINT), electronic warfare (EW), communications jamming (COMJAMM), wideband Ku SATCOM and LOS, ground moving target indicating (GMTI), wide-area surveillance (WAAS) equipment and mapping systems. In a combat role, which may include, without limitation, air-to-surface, air-to-air and air-to-missile combat, the aircraft can be equipped with advanced weapons systems for carrying out precision airstrikes, including Viper Strike laser-guided glide weapons, laser-guided rockets, JAM guided bombs, GBU-12 Paveway II bombs, Hellfire missiles, Advanced Precision Kill Weapon System (APKWS), multi-spectral targeting system and laser range finder/designators. A large scale military VTOL aircraft embodiment may be used, without limitation, in missions currently performed by helicopters, such as troop transport, combat search and rescue, medical evacuation, as well as delivering supplies.

All measurements, dimensions, shapes, amounts, angles, values, percentages, materials, degrees, configurations, orientations, component layouts and configurations, mechanical/electrical supports, mechanical/electrical connection mechanisms, mechanical/electrical movement mechanisms, drive systems, product layout, components or parts; component or part locations, sizes, number of sections, number of components or parts, etc. discussed above or shown in the Figures are merely by way of example and are not considered limiting and other measurements, dimensions, shapes, amounts, angles, values, percentages, materials, degrees, configurations, orientations, component layouts and configurations, mechanical/electrical supports, mechanical/electrical connection mechanisms, mechanical/electrical movement mechanisms, drive systems, product layout, components or parts; component or part locations, sizes, number of sections, number of components or parts, etc. can be chosen and used and all are considered within the scope of the invention.

It will be seen that the objects set forth above, and those made apparent from the foregoing description, are efficiently attained and since certain changes may be made in the above construction without departing from the scope of the invention, it is intended that all matters contained in the foregoing description shall be interpreted as illustrative and not in a limiting sense. The aircraft has been shown and described herein in what is considered to be the most practical and preferred embodiment.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is examined, interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

Dimensions and/or proportions of certain parts in the figures may have been modified and/or exaggerated for the purpose of clarity of illustration and are not considered limiting.

While the aircraft and method of use have been described and disclosed in certain terms and has disclosed certain embodiments or modifications, persons skilled in the art who have acquainted themselves with the disclosure, will appreciate that it is not necessarily limited by such terms, nor to the specific embodiments and modifications disclosed herein. Thus, a wide variety of alternatives, suggested by the teachings herein, can be practiced without departing from the spirit of the disclosure, and rights to such alternatives are particularly reserved and considered within the scope of the disclosure.

While preferred embodiments have been shown and described, various modifications and substitutions may be made thereto without departing from the spirit and scope of the disclosure. Accordingly, it is to be understood that the novel aircraft and method of use have been described by way of illustrations and not limitation. This description and the accompanying drawings illustrate exemplary embodiments for the aircraft. Other embodiments are possible and modifications may be made to the exemplary embodiments without departing from the spirit and scope of the disclosure. It will be apparent to one of ordinary skill in the art that the embodiments as described above may be implemented in many different embodiments of aircrafts, and in drive systems for other aircraft types as well. Therefore, the description and drawings are not meant to limit the invention. Instead, the appended claims define the scope of the disclosure.

What is claimed is:

1. A powered-lift aircraft capable of vertical take-off and vertical landing, hovering and translational and traverse flight, comprising:
    a continuous wing defining a cavity;
    one or more propulsion impeller rings rotatably supported within the cavity of the continuous wing;
    a cockpit or payload enclosure disposed within a portion of the cavity and pivotally mounted to and at least partially surrounded by the continuous wing; and
    an attitude control system configured to maintain a longitudinal axis for the cockpit or payload enclosure in a generally constant level attitude independent of an attitude of the continuous wing;
    wherein during vertical takeoff of the aircraft the one or more propulsion impeller rings rotate at rotational speeds that are sufficient to provide enough thrust force to overcome a weight amount of the aircraft;
    wherein the continuous wing is substantially axially horizontally oriented during level flight of the aircraft.

2. The powered-lift aircraft of claim 1 wherein portions of the continuous wing having a non-constant cross-sectional shape contoured for providing lift.

3. The powered-lift aircraft of claim 2 wherein the one or more propulsion impeller rings are a pair of propulsion impeller rings housed within the cavity and such that a first of the pair of propulsion impeller rings rotates in a clockwise or counter-clockwise manner and the second of the pair of propulsion impeller rings rotates in an opposite manner as the rotation of the first propulsion impeller ring.

4. The powered-lift aircraft of claim 1 further comprising an impeller ring drive system that is supported within the continuous wing or the cockpit or payload enclosure.

5. The powered-lift aircraft of claim 1 further comprising a plurality of impeller blades that are pivotally or rotatably connected to at least one of the one or more propulsion impeller rings for variable pitch control, the plurality of impeller blades extending inward from the pivot connection to the impeller rings such that an outer portion of the plurality of impeller blades are positioned within the cavity defined by the continuous wing and generally pointing toward the cockpit or payload enclosure.

6. The powered-lift aircraft of claim 5 further comprising an asymmetric impeller blade pitch control system operatively connected to the impeller blades to allow for individual and differential control of the impeller blades by the blade pitch control system to cause the one or more propulsion impeller rings to provide asymmetrical thrust.

7. The powered-lift aircraft of claim 5 wherein the impeller blades extend radially inward from at least one of the one or more of the impeller rings.

8. The powered-lift aircraft of claim 5 further comprising a drive system housed within the continuous wing for individually and incrementally pivoting the plurality of impeller blades to provide variable pitch control.

9. The power-lift aircraft of claim 5 wherein each of the plurality of impeller blades can be individually manipulated to pivot or rotate in a particular direction independent of the other impeller blades of the plurality of impeller blades.

10. The powered-lift aircraft of claim 1 further comprising an emergency ballistic recovery system associated with the cockpit or payload enclosure.

11. The powered-lift aircraft of claim 1 wherein the continuous wing axially vertically oriented during vertical flight, hovering and vertical landing of the aircraft.

12. The powered-lift aircraft of claim 1 further comprising an axle extending from a first area of the continuous wing to a second area of the continuous wing and across the cavity and connected to the cockpit or payload enclosure for providing pivotal communication between the cockpit or payload enclosure and the continuous wing.

13. The powered-lift aircraft of claim 1 further comprising one or more powerplants secured to the continuous wing and operatively associated with the one or more propulsion impeller rings for causing the one or more propulsion impeller rings to rotate.

14. The power-lift aircraft of claim 1 further comprising one or more air bearings for supporting the one or more propulsion impeller rings within the cavity of the continuous wing.

15. The power-lift aircraft of claim 1 wherein the cockpit or payload enclosure having a teardrop or airfoil configuration which serves as a middle wing of a tri-fold configuration during generally level flight of the aircraft.

16. A powered-lift aircraft, comprising:
    a continuous wing defining a central open space area;
    one or more propulsion impeller rings rotatably supported within the central open space area of the continuous wing;

a cockpit or payload enclosure disposed within a portion of the central open space area and pivotally mounted to and at least partially surrounded by the continuous wing; and an attitude control system configured to maintain a longitudinal axis for the cockpit or payload enclosure in a generally constant level attitude independent of an attitude of the continuous wing;

wherein during vertical takeoff of the aircraft the one or more propulsion impeller rings rotate at rotational speeds that are sufficient to provide enough thrust force to overcome a weight amount of the aircraft; wherein the continuous wing is axially substantially horizontally oriented during level flight of the aircraft.

17. The powered-lift aircraft of claim 16 further comprising movable surfaces provided on a leading or trailing edge of the continuous wing and movable from an open position to a closed position; wherein in the open position the movable surface influence or redirect air flow.

18. The powered-lift aircraft of claim 16 wherein the continuous wing defining one or more air vents or outlets circumferentially positioned along a leading edge or trailing edge of the continuous wing and further comprising one or move valves or vanes to control airflow through the vents.

19. The powered-lift aircraft of claim 16 further comprising one or more ducted fan assemblies mounted to the continuous wing.

20. The powered-lift aircraft of claim 16 further comprising one or more propeller assemblies mounted to the continuous wing.

\* \* \* \* \*